(12) United States Patent
Hoshino et al.

(10) Patent No.: US 11,371,566 B2
(45) Date of Patent: Jun. 28, 2022

(54) WET FRICTION MEMBER

(71) Applicant: AISIN KAKO KABUSHIKI KAISHA, Toyota (JP)

(72) Inventors: Ryohei Hoshino, Toyota (JP); Hiroyuki Hara, Toyota (JP)

(73) Assignee: AISIN KAKO KABUSHIKI KAISHA, Toyota (JP)

( * ) Notice: Subject to any disclaimer, the term of this patent is extended or adjusted under 35 U.S.C. 154(b) by 241 days.

(21) Appl. No.: 16/679,395

(22) Filed: Nov. 11, 2019

(65) Prior Publication Data

US 2020/0158185 A1 May 21, 2020

(30) Foreign Application Priority Data

Nov. 16, 2018 (JP) .............................. JP2018-215987

(51) Int. Cl.
*F16D 13/64* (2006.01)
*F16D 65/12* (2006.01)
*F16D 13/72* (2006.01)
*F16D 69/02* (2006.01)
*F16D 69/04* (2006.01)
(Continued)

(52) U.S. Cl.
CPC ............. *F16D 13/64* (2013.01); *F16D 13/72* (2013.01); *F16D 65/122* (2013.01); *F16D 65/128* (2013.01); *F16D 69/026* (2013.01); *F16D 69/04* (2013.01); *F16D 2065/1324* (2013.01); *F16D 2069/004* (2013.01); *F16D 2069/0458* (2013.01); *F16D 2069/0466* (2013.01);
(Continued)

(58) Field of Classification Search
CPC ........ F16D 13/64; F16D 13/648; F16D 13/72; F16D 13/74
USPC ........................... 188/71.5, 71.6; 192/70.12, 192/113.34–113.36
See application file for complete search history.

(56) References Cited

U.S. PATENT DOCUMENTS 6,499,579 B2 12/2002 Ono et al.
6,712,190 B2 3/2004 Kitaori et al.
(Continued)

FOREIGN PATENT DOCUMENTS

JP 2001-295859 A 10/2001
JP 2003-090370 A 3/2003
(Continued)

*Primary Examiner* — Christopher P Schwartz
(74) *Attorney, Agent, or Firm* — Oblon, McClelland, Maier & Neustadt, L.L.P.

(57) ABSTRACT

The wet friction member 1 of the invention includes a core plate 2 formed in a flat ring shape, a friction part 3 arranged in a ring shape. The friction part 3 has segment pieces including rectangular shaped $G_1$ to $G_4$: $G_1$ in which a lower right corner of rectangular piece is notched; $G_2$ in which an upper left corner of rectangular piece is notched; $G_3$ in which an upper right corner of rectangular piece is notched; $G_4$ in which a lower left corner of rectangular piece is notched. The friction part 3 has arrangements $T_1$ and $T_2$: $T_1$ in which $G_1$ and $G_2$ are arranged in a manner a right side of $G_1$ and a left side of $G_2$ face each other; $T_2$ in which $G_3$ and $G_4$ are arranged in a manner a right side of the $G_3$ and a left side of $G_4$ face each other.

11 Claims, 17 Drawing Sheets

(51) Int. Cl.
*F16D 69/00* (2006.01)
*F16D 65/02* (2006.01)

(52) U.S. Cl.
CPC ............... *F16D 2200/0021* (2013.01); *F16D 2200/0034* (2013.01)

(56) References Cited

U.S. PATENT DOCUMENTS

| | | | |
|---|---|---|---|
| 7,434,673 | B2 | 10/2008 | Muranaka et al. |
| 10,962,065 | B2 * | 3/2021 | Hoshino ................. F16D 13/74 |
| 2001/0042668 | A1 * | 11/2001 | Ono ........................ F16D 13/74 |
| | | | 192/113.36 |
| 2003/0051967 | A1 | 3/2003 | Kitaori et al. |
| 2005/0217965 | A1 | 10/2005 | Muranaka et al. |
| 2014/0346003 | A1 * | 11/2014 | Okamura .............. F16D 13/648 |
| | | | 192/107 M |
| 2015/0362023 | A1 * | 12/2015 | Tohyama ................ F16D 69/00 |
| | | | 192/70.12 |
| 2019/0309811 | A1 | 10/2019 | Hoshino et al. |

FOREIGN PATENT DOCUMENTS

| | | | |
|---|---|---|---|
| JP | 2005-282648 A | 10/2005 | |
| JP | 2016-098901 A | 5/2016 | |

* cited by examiner

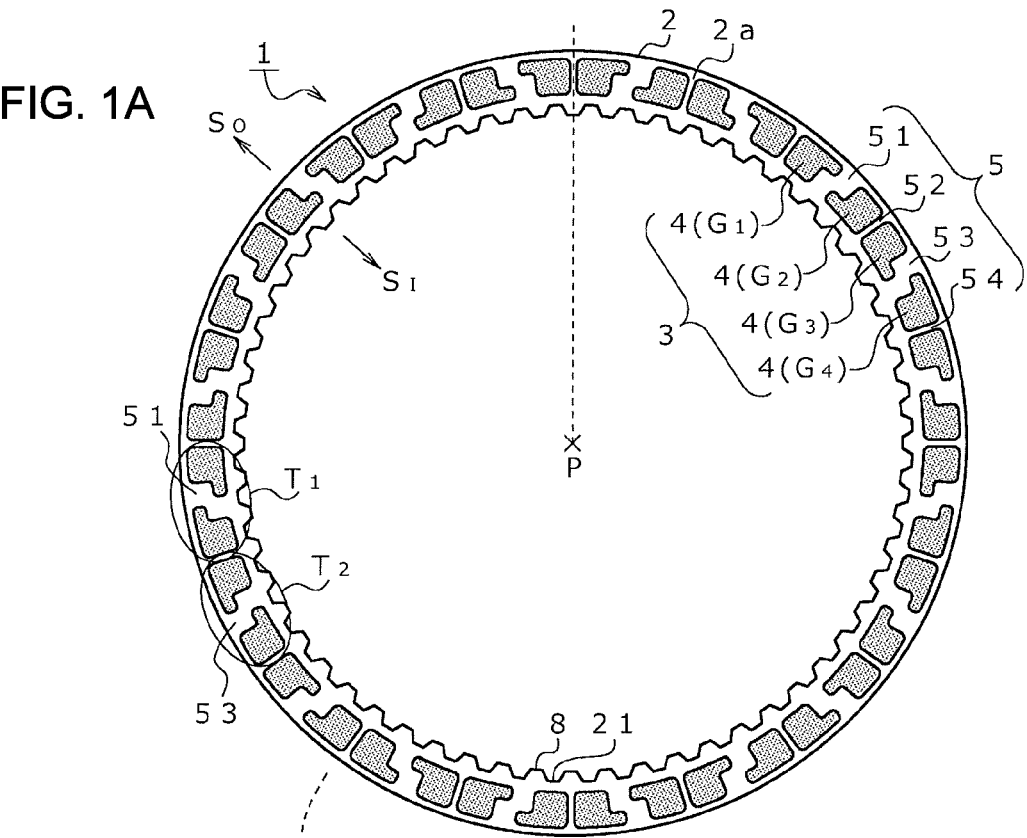
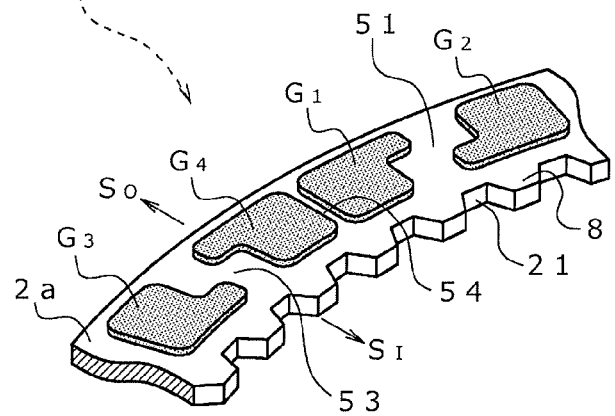

WET FRICTION MEMBER

CROSS REFERENCE

This application claims priority of Japanese Patent Application No. 2018-215987 filed on Nov. 16, 2018 under 35 U.S.C. § 119, the disclosures of which are expressly incorporated herein by reference in their entirety.

BACKGROUND OF THE INVENTION

(1) Field of the Invention

The present invention relates to a wet friction member. More particularly, the present invention relates to a wet friction member to be used in the presence of lubricating oil.

(2) Description of Related Art

Wet clutches and wet brakes using wet friction members have been conventionally used for torque transmission, braking, and the like. For example, a wet friction member is used in a wet clutch in an automatic transmission for an automobile or the like.

The wet clutch has a structure in which a plurality of wet friction members and a plurality of separator plates are alternately arranged via small clearances, and in which the wet friction members and the separator plates are pressure-contacted with/separated from each other for torque transmission/non-transmission. Lubricating oil is also supplied into the clutch, for example, to reduce the friction of the wet friction members in the pressure contact/separation and to absorb the frictional heat caused by friction. It is known that, when this clutch is not engaged, the wet friction members and the separator plates are separated from each other and relatively rotated, and that a torque called drag torque is generated at that time.

Since this drag torque consumes unnecessary energy when the clutch idly rotates, the reduction in drag torque is desired as a measure for reducing fuel consumption which has been rapidly advanced in recent years. As techniques for reducing this drag torque, the techniques described in JP 2003-090370 A and JP 2005-282648 A are known.

SUMMARY OF THE INVENTION

JP 2003-090370 A discloses a wet friction member (FIG. 3) in which the width of an oil groove is increased from the inner peripheral side toward the outer peripheral side. It discloses that the drag torque is reduced as the relative rotation speed is increased by this structure (FIG. 7).

JP 2005-282648 A discloses a wet friction member in which oil grooves each having an inner peripheral opening part which spreads in a bilaterally symmetric shape and oil grooves each having an approximately uniform width are mixed. It discloses that, due to this structure, the lubricating oil supplied from the inner periphery comes into contact with a rectangularly spreading portion 34 on the rear side of rotation, thus that the lubricating oil is positively supplied to a friction surface, thereby suppressing contact between a separator plate and the friction surface, and that the excessive lubricating oil is discharged from the oil grooves 16b having an approximately uniform width (FIG. 6(c)).

However, a wet friction member that can uniformly reduce the drag torque in the entire region from high rotation to low rotation is not known, and the actual situation is that a reduction in drag torque is actualized by selecting the optimum form depending on various product requirements.

Therefore, it is required to pool more options for the drag torque reduction form.

The present invention has been made in view of the actual situation, and it is an object thereof to provide a wet friction member which can achieve a reduction in drag torque by virtue of a form different from conventional ones.

The present invention is as follows.

[1] A wet friction member of the first invention comprising a core plate formed in a flat ring shape and a friction part arranged in a ring shape on a main surface of the core plate,
wherein the friction part comprises a plurality of segment pieces including the following segment pieces ($G_1$) to ($G_4$):
($G_1$) a first piece in which a lower right corner of an approximately rectangular piece is notched in an approximately rectangular shape;
($G_2$) a second piece in which an upper left corner of an approximately rectangular piece is notched in an approximately rectangular shape;
($G_3$) a third piece in which an upper right corner of an approximately rectangular piece is notched in an approximately rectangular shape; and
($G_4$) a fourth piece in which a lower left corner of an approximately rectangular piece is notched in an approximately rectangular shape;
and the friction part has the following arrangements ($T_1$) and ($T_2$):
($T_1$) an arrangement in which the first piece and the second piece are arranged in a manner that a right side of the first piece and a left side of the second piece face each other via an oil groove; and
($T_2$) an arrangement in which the third piece and the fourth piece are arranged in a manner that a right side of the third piece and a left side of the fourth piece face each other via an oil groove.

[2] A wet friction member of the second invention comprising a core plate formed in a flat ring shape and a friction part arranged in a ring shape on a main surface of the core plate,
wherein the friction part comprises a plurality of segment pieces including at least three pieces of the following segment pieces ($G_1$) to ($G_8$):
($G_1$) a first piece in which a lower right corner of an approximately rectangular piece is notched in an approximately rectangular shape;
($G_2$) a second piece in which an upper left corner of an approximately rectangular piece is notched in an approximately rectangular shape;
($G_3$) a third piece in which an upper right corner of an approximately rectangular piece is notched in an approximately rectangular shape;
($G_4$) a fourth piece in which a lower left corner of an approximately rectangular piece is notched in an approximately rectangular shape;
($G_5$) a fifth piece in which a lower right corner and a lower left corner of an approximately rectangular piece are each notched in an approximately rectangular shape;
($G_6$) a sixth piece in which an upper right corner and an upper left corner of an approximately rectangular piece are each notched in an approximately rectangular shape;
($G_7$) a seventh piece in which a lower right corner and an upper left corner of an approximately rectangular piece are each notched in an approximately rectangular shape; and ($G_8$) an eighth piece in which an upper right corner and a lower left corner of an approximately rectangular piece are each notched in an approximately rectangular shape;

and the friction part has at least one arrangement selected from a group consisting of the following arrangements ($T_3$) to ($T_6$):

($T_3$) an arrangement in which the first piece, the sixth piece, and the fourth piece are arranged in a manner that a right side of the first piece and a left side of the sixth piece face each other via an oil groove and that a right side of the sixth piece and a left side of the fourth piece face each other via an oil groove;

($T_4$) an arrangement in which the third piece, the fifth piece, and the second piece are arranged in a manner that a right side of the third piece and a left side of the fifth piece face each other via an oil groove and that a right side of the fifth piece and a left side of the second piece face each other via an oil groove;

($T_5$) an arrangement in which the fifth piece, the seventh piece, and the sixth piece are arranged in a manner that a right side of the fifth piece and a left side of the seventh piece face each other via an oil groove and that a right side of the seventh piece and a left side of the sixth piece face each other via an oil groove; and ($T_6$) an arrangement in which the sixth piece, the eighth piece, and the fifth piece are arranged in a manner that a right side of the sixth piece and a left side of the eighth piece face each other via an oil groove and that a right side of the eighth piece and a left side of the fifth piece face each other via an oil groove.

[3] A wet friction member of the third invention comprising a core plate formed in a flat ring shape and a friction part arranged in a ring shape on a main surface of the core plate, wherein the friction part comprises a plurality of segment pieces including the following segment pieces ($G_5$) and ($G_6$):

($G_5$) a fifth piece in which a lower right corner and a lower left corner of an approximately rectangular piece are each notched in an approximately rectangular shape; and ($G_6$) a sixth piece in which an upper right corner and an upper left corner of an approximately rectangular piece are each notched in an approximately rectangular shape; and wherein the fifth piece ($G_5$) and the sixth piece ($G_6$) are arranged adjacent to each other via an oil groove.

[4] In the wet friction members of the first and second inventions, all of the segment pieces of the pieces ($G_1$) to ($G_4$) can satisfy $0.10 \leq W_2/W_1 \leq 0.80$, when a maximum width thereof is $W_1$ and a maximum width of notch parts thereof is $W_2$.

[5] In the wet friction members of the first and second inventions, all of the segment pieces of the pieces ($G_1$) to ($G_4$) can satisfy $0.25 \leq H_2/H_1 \leq 0.75$, when a maximum height thereof is $H_1$ and a maximum height of notch parts thereof is $H_2$.

[6] In the wet friction members of the second and third inventions, all of the segment pieces of the pieces ($G_5$) to ($G_8$) can satisfy $0.05 \leq W_2/W_1 \leq 0.40$, when a maximum width thereof is $W_1$ and the maximum width of one of notch parts thereof is $W_2$.

[7] In the wet friction members of the second and third inventions, all of the segment pieces of the pieces ($G_5$) to ($G_8$) can satisfy $0.25 \leq H_2/H_1 \leq 0.75$, when a maximum height thereof is $H_1$ and a maximum height of one of notch parts thereof is $H_2$.

The wet friction member of the present invention can achieve a reduction in drag torque by virtue of a structure different from conventional ones.

In particular, the wet friction member of the present invention has segment pieces each having a specific shape and a specific arrangement thereof. Thus, specific notch parts are combined so that the wet friction member can have an arrangement which promotes lubricating oil discharge and an arrangement which promotes lubricating oil intake. Therefore, the reduction in drag torque can be achieved widely within a range of from a low rotation region to a high rotation region, and a remarkably excellent torque reduction effect can be exerted within a range of from a low rotation region to a middle rotation region.

In the wet friction member of the present invention, when all the segment pieces of the pieces ($G_1$) to ($G_4$) satisfy $0.10 \leq W_2/W_1 \leq 0.80$ in the case where their maximum width is $W_1$ and the maximum width of their notch parts is $W_2$, it is possible to obtain an excellent drag torque reduction effect as compared with a form not having this structure.

In the wet friction member of the present invention, when all the segment pieces of the pieces ($G_1$) to ($G_4$) satisfy $0.25 \leq H_2/H_1 \leq 0.75$ in the case where their maximum height is $H_1$ and the maximum height of their notch parts is $H_2$, it is possible to obtain an excellent drag torque reduction effect as compared with a form not having this structure.

In the wet friction member of the present invention, when all the segment pieces of the pieces ($G_5$) to ($G_8$) satisfy $0.05 \leq W_2/W_1 \leq 0.40$ in the case where their maximum width is $W_1$ and the maximum width of one of their notch parts is $W_2$, it is possible to obtain an excellent drag torque reduction effect as compared with a form not having this structure.

In the wet friction member of the present invention, when all the segment pieces of the pieces ($G_5$) to ($G_8$) satisfy $0.25 \leq H_2/H_1 \leq 0.75$ in the case where their maximum height is $H_1$ and the maximum height of one of their notch parts is $H_2$, it is possible to obtain an excellent drag torque reduction effect as compared with a form not having this structure.

BRIEF DESCRIPTION OF THE DRAWINGS

FIG. 1A is a plan view showing an example of a first wet friction member, and FIG. 1B is a perspective view showing a part thereof in an enlarged manner;

DETAILED DESCRIPTION OF PREFERRED EMBODIMENTS

Figure 2A:
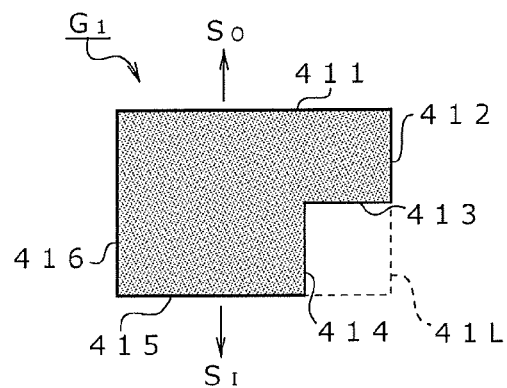
FIGS. 2A to 2C are explanatory views for explaining the shape and variations of a first piece.

Hereinafter, the present invention will be described with reference to the drawings. The particulars described herein are given by way of example and for the purpose of illustrative discussion of the embodiments of the present invention, and are presented for the purpose of providing what is believed to be the description from which the principles and conceptual features of the present invention can be most effectively and readily understood. In this point, the embodiments are necessary for fundamental comprehension of the present invention and how some embodiments of the present invention are embodied in practice is clearly shown to those skilled in the art by an explanation in connection with drawings without intending to indicate a structural detail of the present invention above a certain level.

The planar shape of each part will be explained in the present description on the assumption that the part is placed at the 12 o'clock position on a clock dial. For example, a segment piece will be explained on the assumption that the segment piece is placed at the 12 o'clock position on a clock dial. Therefore, for the predetermined segment piece, the term "right" means a direction from the 9 o'clock position to the 3 o'clock position on the clock dial, and the term "left" means a direction from the 3 o'clock position to the 9 o'clock position thereon. Further, the term "upper" means a direction from the 6 o'clock position to the 12 o'clock position on a clock dial, and the term "lower" means a direction from the 12 o'clock position to the 6 o'clock position thereon.

1. Wet Friction Member of First Invention

A wet friction member (1) of a first invention includes a core plate (2) formed in a flat ring shape and a friction part (3) arranged in a ring shape on a main surface (2a) of the core plate (2).

Between these, the friction part (3) includes a plurality of segment pieces (4) including segment pieces of ($G_1$) to ($G_4$) and includes arrangements ($T_1$) and ($T_2$) (see FIGS. 1 to 9).

1-1. Core Plate

The core plate 2 has a flat ring shape. In other words, it has an annular shape in which the center of a plate body is opened. The core plate 2 has the center of the ring shape as rotation center P. The main surface 2a of the core plate 2 is a surface to which segment pieces 4 are joined to form the friction part 3. The main surface 2a may be provided only on one surface of the core plate 2 or on both surfaces thereof. That is, the friction part 3 may be formed only on one surface of the core plate 2 or may be formed on both surfaces thereof.

In addition to the main surface 2a, the core plate 2 may have other necessary structures as appropriate. As such other structures, engagement teeth and the like can be indicated. The engagement teeth can be provided protruding from the inner or outer peripheral surface of the core plate 2. Specifically, the core plate 2 can have engagement teeth 8 protruding from an inner peripheral surface 21, as shown in FIGS. 1A and 1B. The engagement teeth 8 are arranged so as to be engageable with splines arranged on the outer periphery of a hub serving as a rotation axis with respect to the wet friction member 1.

The size or the like of the core plate 2 is not limited, nor is the correlation between the outer diameter and the inner diameter limited. For example, when the outer diameter is $R_1$ (diameter of the outer periphery) and the inner diameter is $R_2$ (if the core plate 2 has the engagement teeth 8, the inner peripheral surface 21 except the engagement teeth 8 is defined as a reference), the ratio $R_1/R_2$ can be set to $1 \leq R_1/R_2 \leq 10$, to $1.05 \leq R_1/R_2 \leq 5$, and to $1.1 \leq R_1/R_2 \leq 3$.

Further, when the thickness of the core plate 2 is D (mm), the thickness D is not limited, but can be set, for example, to $0.1 \leq D$ (mm)$\leq 10$ mm, to $0.3 \leq D$ (mm)$\leq 7$, and to $0.5 \leq D$ (mm)$\leq 5$.

Furthermore, the core plate 2 may be made of any material, and various kinds of carbon steel (S35C, S55C, etc.), cold rolled steel sheets (SPCC, SPCCT, etc.), low carbon high tensile strength steel (NCH780, etc.) can be used as the material therefor.

1-2. Friction Part

The friction part 3 includes the segment pieces 4 and oil grooves 5. Specifically, the plurality of segment pieces 4 are formed to be arranged in a ring shape via the oil grooves 5.

The friction part 3 has the function of adjusting the degree of interlocking between the wet friction member 1 and a mating member (for example, separator plate) adjacent thereto depending on the degree of contact therebetween. That is, it has a brake function (braking function) and a torque transmission function with respect to the mating member.

The friction part 3 may take either the same form or different forms on the front main surface 2a and the back main surface 2a of the core plate 2.

1-3. Segment Piece

The segment pieces 4 constitute the friction part 3 as described above, and their surfaces serve as friction surfaces. Since the oil grooves 5 are formed to be defined by the segment pieces 4, the shapes of the oil grooves 5 are also determined by the outer shapes of the segment pieces 4 and the arrangement thereof.

The segment pieces 4 used in the wet friction member 1 of the first invention (see FIGS. 1A and 1B) include at least four kinds, i.e., a first piece $G_1$, a second piece $G_2$, a third piece $G_3$ and a fourth piece $G_4$. The segment piece 4 may consist only of these four kinds, or may include pieces having shapes other than those of these four kinds.

1-3-1. First piece $G_1$

Figure 2B:
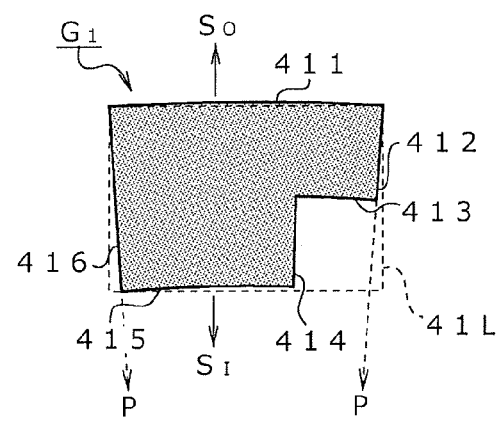
Figure 2C:
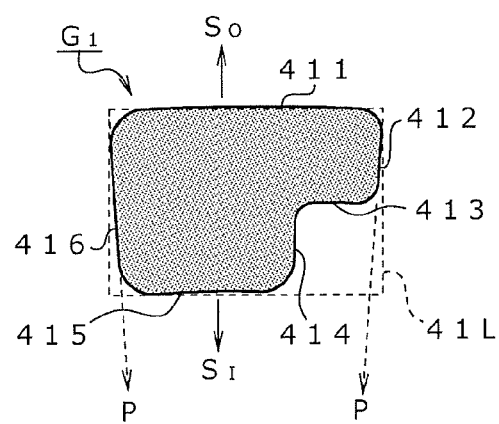

The first piece $G_1$ is a segment piece in which the lower right corner of an approximately rectangular piece is notched in an approximately rectangular shape (see FIGS. 2A to 2C). That is, the first piece $G_1$ is a segment piece formed in a shape having an approximately rectangular notch part 41L at the lower right of an approximately rectangular piece.

As shown in FIG. 2A, this first piece $G_1$ can be formed only from straight lines. In this case, the first piece $G_1$ can include six sides, i.e., sides 411 to 416.

Further, as shown in FIG. 2B, in the first piece $G_1$, the sides 411, 413, and 415 can be formed by curved lines. Specifically, the sides can be formed by curved lines bulging toward the outer peripheral side $S_O$ so as to have a curvature according to the distance from the rotation center P. Furthermore, for the purpose of forming the oil grooves 5 having an approximately constant groove width, the sides 412 and 416 can be formed by straight lines inclined so that the rotation center P is positioned on the extension line thereof. Further, as shown in FIG. 2C, each corner part of the first piece $G_1$ can be chamfered into a curved shape.

The size of the notch part 41L in the first piece $G_1$ is not limited, but when the maximum width of the first piece $G_1$ is $W_1$ and the maximum width of the notch part 41L of the first piece is $W_2$ (see FIG. 6), the first piece $G_1$ can satisfy $0.10 \leq W_2/W_1 \leq 0.80$. In this range, an excellent drag torque reduction effect can be obtained. The $W_2/W_1$ can be further set to $0.15 \leq W_2/W_1 \leq 0.70$, further to $0.18 \leq W_2/W_1 \leq 0.65$, further to $0.20 \leq W_2/W_1 \leq 0.60$, further to $0.23 \leq W_2/W_1 \leq 0.40$, and further to $0.25 \leq W_2/W_1 \leq 0.40$. In each of these ranges, a better drag torque reduction effect can be obtained.

Further, when the maximum height of the first piece $G_1$ is $H_1$ and the maximum height of the notch part 41L of the first piece $G_1$ is $H_2$ (see FIG. 6), the first piece $G_1$ can satisfy $0.25 \leq H_2/H_1 \leq 0.75$. In this range, an excellent drag torque reduction effect can be obtained. The $H_2/H_1$ can be further set to $0.10 \leq H_2/H_1 \leq 0.80$, further to $0.15 \leq H_2/H_1 \leq 0.70$, further to $0.20 \leq H_2/H_1 \leq 0.65$, further to $0.22 \leq H_2/H_1 \leq 0.60$, further to $0.24 \leq H_2/H_1 \leq 0.50$, and further to $0.25 \leq H_2/H_1 \leq 0.40$.

In each of these ranges, a better drag torque reduction effect can be obtained.

1-3-2. Second Piece $G_2$

Figure 3A:
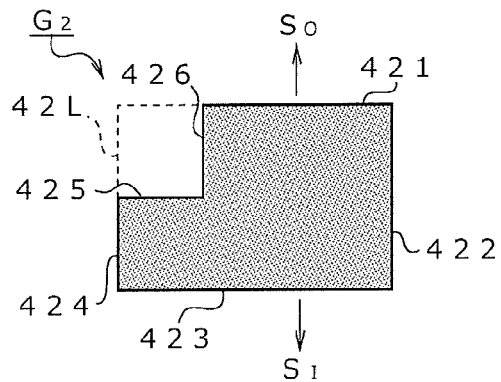
FIGS. 3A to 3C are explanatory views for explaining the shape and variations of a second piece.
Figure 3B:
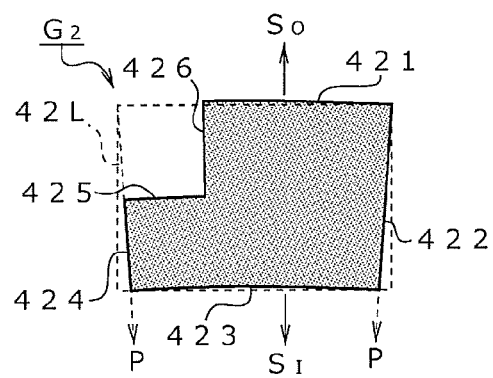
Figure 3C:
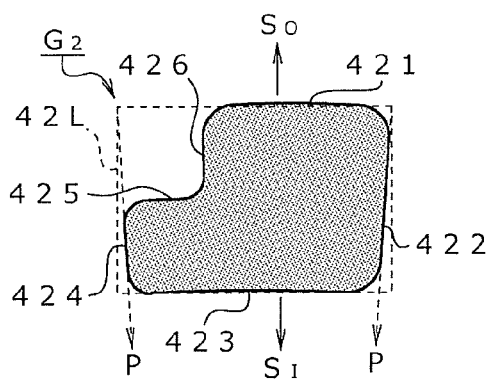

The second piece $G_2$ is a segment piece in which the upper left corner of an approximately rectangular piece is notched in an approximately rectangular shape (see FIGS. 3A to 3C). That is, it is a segment piece formed in a shape having an approximately rectangular notch part 42L at the upper left of an approximately rectangular piece.

As in the case of the first piece $G_1$, this second piece $G_2$ can be formed only from straight lines, as shown in FIG. 3A. In this case, the second piece $G_2$ can include six sides, i.e., sides 421 to 426.

Further, as shown in FIG. 3B, in the second piece $G_2$, the sides 421, 423, and 425 can be formed by curved lines. Specifically, the sides can be formed by curved lines bulging toward the outer peripheral side $S_O$ so as to have a curvature according to the distance from the rotation center P. Further, in order that the oil grooves 5 have an approximately constant groove width, the sides 422 and 426 can be formed by straight lines inclined so that the rotation center P is positioned on the extension line thereof. Further, as shown in FIG. 3C, each corner part of the second piece $G_2$ can be chamfered into a curved shape.

Further, the size of the notch part 42L in the second piece $G_2$ is not limited, and the descriptions regarding the ratios $W_2/W_1$ and $H_2/H_1$ of the first piece $G_1$ can be directly applied to the second piece $G_2$.

1-3-3. Third Piece $G_3$

Figure 4A:
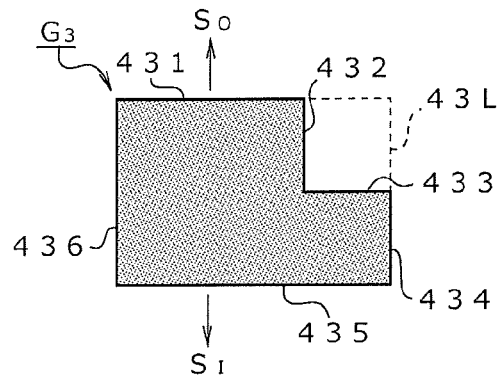
FIGS. 4A to 4C are explanatory views for explaining the shape and variations of a third piece.
Figure 4B:
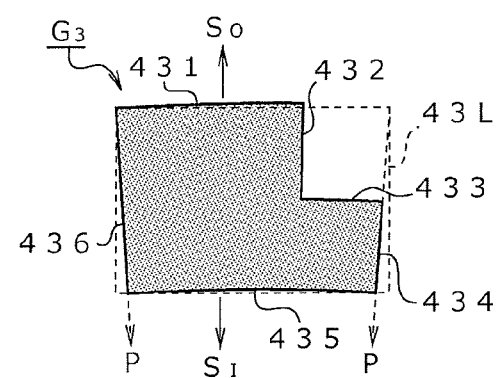
Figure 4C:
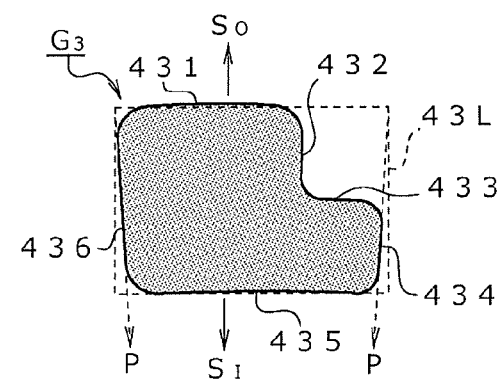

The third piece $G_3$ is a segment piece in which the upper right corner of an approximately rectangular piece is notched in an approximately rectangular shape (see FIGS. 4A to 4C). That is, the third piece $G_3$ is a segment piece formed in a shape having an approximately rectangular notch part 43L at the upper right of an approximately rectangular piece.

As shown in FIG. 4A, the third piece $G_3$ can be formed from only straight lines. In this case, the third piece $G_3$ can include six sides, i.e., sides 431 to 436.

Further, as shown in FIG. 4B, in the third piece $G_3$, the sides 431, 433, and 435 can be formed by curved lines. Specifically, the sides can be formed by curved lines bulging toward the outer peripheral side $S_O$ so as to have a curvature according to the distance from the rotation center P. Further, in order that the oil grooves 5 have an approximately constant groove width, the sides 432 and 434 can be formed by straight lines inclined so that the rotation center P is positioned on the extension line thereof. Further, as shown in FIG. 4C, each corner part of the third piece $G_3$ can be chamfered into a curved shape.

Further, the size of the notch part 43L in the third piece $G_3$ is not limited, and the descriptions regarding the ratios $W_2/W_1$ and $H_2/H_1$ of the first piece $G_1$ can be directly applied to the third piece $G_3$.

1-3-4. Fourth Piece $G_4$

Figure 5A:
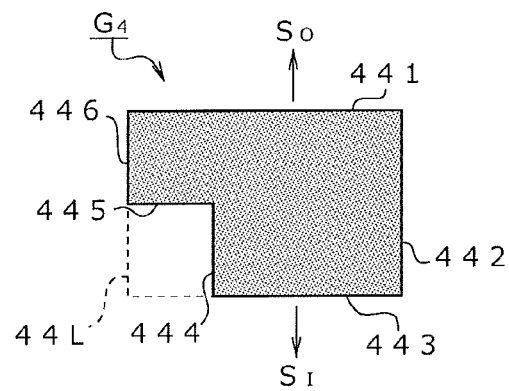
FIGS. 5A to 5C are explanatory views for explaining the shape and variations of a fourth piece.
Figure 5B:
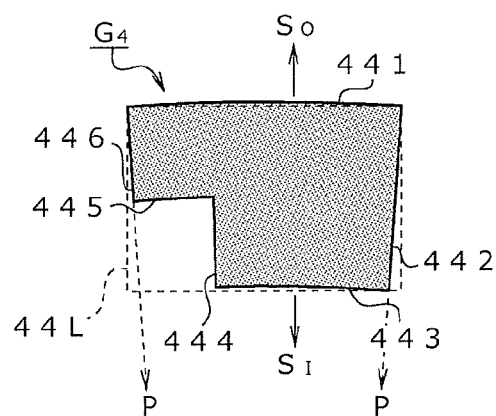
Figure 5C:
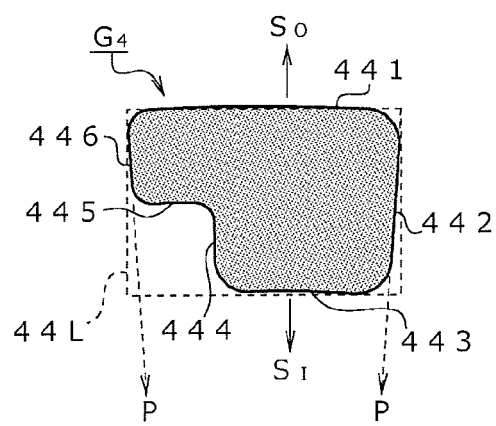
Figure 6:
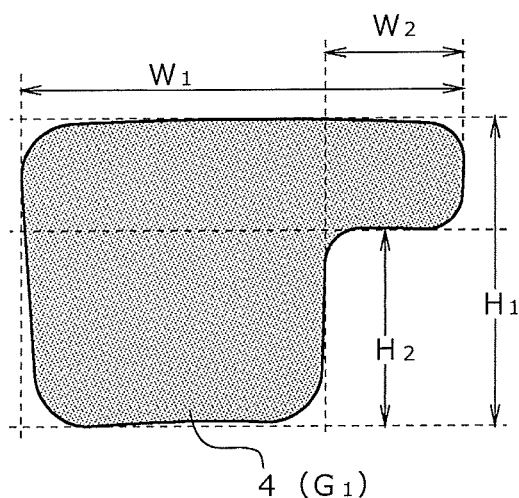
FIG. 6 is an explanatory view for explaining the sizes of a segment piece and a notch part.

The fourth piece $G_4$ is a segment piece in which the lower left corner of an approximately rectangular piece is notched in an approximately rectangular shape (see FIGS. 5A to 5C). That is, it is a segment piece formed in a shape having an approximately rectangular notch part 44L at the lower left of an approximately rectangular piece.

As in the case of the first piece $G_1$, this fourth piece $G_4$ can be formed only from straight lines, as shown in FIG. 5A. In this case, the fourth piece $G_4$ can include six sides, i.e., sides 441 to 446.

Further, as shown in FIG. 5B, in the fourth piece $G_4$, the sides 441, 443, and 445 can be formed by curved lines. Specifically, the sides can be formed by curved lines bulging toward the outer peripheral side $S_O$ so as to have a curvature according to the distance from the rotation center P. Further, in order that the oil grooves 5 have an approximately constant groove width, the sides 442 and 446 can be formed by straight lines inclined so that the rotation center P is positioned on the extension line thereof. Further, as shown in FIG. 5C, each corner part of the fourth piece $G_4$ can be chamfered into a curved shape.

Further, the size of the notch part 44L in the fourth piece $G_4$ is not limited, and the descriptions regarding the ratios $W_2/W_1$ and $H_2/H_1$ of the first piece $G_1$ can be directly applied to the fourth piece $G_4$.

1-3-5. First Piece $G_1$ to Fourth Piece $G_4$

Further, the maximum widths $W_1$ and the maximum heights $H_1$ of the segment pieces of the first piece $G_1$ to the fourth piece $G_4$ may be different, but are preferably the same. In the case where they are the same, it is possible to make uniform the shapes of the oil grooves 5 formed between the respective segment pieces. Therefore, it is possible to more reliably achieve the drag torque reduction while suppressing variations.

Further, the maximum widths $W_2$ and the maximum heights $H_2$ of the notch parts of the segment pieces of the first piece $G_1$ and the fourth piece $G_4$ may be different, but are preferably the same. In the case where they are the same, it is possible to make uniform the shapes of the oil grooves 5 formed between the respective segment pieces. Therefore, it is possible to more reliably achieve the drag torque reduction while suppressing variations.

The first piece $G_1$ and the fourth piece $G_4$ may be asymmetric to each other but are preferably line-symmetric, in a plan view. That is, more specifically, it is preferable that the first piece $G_1$ and the fourth piece $G_4$ be mirror-symmetric to each other. When these are line-symmetric shapes, the shapes of the oil grooves 5 formed between the respective segment pieces can be made uniform. Therefore, it is possible to more reliably achieve the drag torque reduction while suppressing variations. In addition, since the first piece $G_1$ can be used as the fourth piece $G_4$ by reversing the first piece $G_1$, the first piece $G_1$ and the fourth piece $G_4$ can be manufactured simultaneously by single punching. Therefore, the segment pieces 4 are easily manufactured, which is an excellent cost merit.

Similarly, the second piece $G_2$ and the third piece $G_3$ may be asymmetric to each other but are preferably line-symmetric, in a plan view. That is, more specifically, it is preferable that the second piece $G_2$ and the third piece $G_3$ be mirror-symmetric to each other. When these are line-symmetric shapes, the shapes of the oil grooves 5 formed between the respective segment pieces can be made uniform. Therefore, it is possible to more reliably achieve the drag torque reduction while suppressing variations. In addition, since the second piece $G_2$ can be used as the third piece $G_3$ by reversing the second piece $G_2$, the second piece $G_2$ and the third piece $G_3$ can be manufactured simultaneously by single punching. Therefore, the segment pieces 4 are easily manufactured, which is an excellent cost merit.

1-3-6. Arrangements $T_1$ and $T_2$

The wet friction member 1 of the first invention includes both arrangements $T_1$ and $T_2$ at the same time.

The arrangement $T_1$ is an arrangement in which the first piece $G_1$ and the second piece $G_2$ are arranged in a manner that the right side of the first piece $G_1$ and the left side of the second piece $G_2$ face each other via an oil groove 51. On the other hand, the arrangement $T_2$ is an arrangement in which the third piece $G_3$ and the fourth piece $G_4$ are arranged in a manner that the right side of the third piece $G_3$ and the left side of the fourth piece $G_4$ face each other via an oil groove 53. Between these, the oil groove 51 is formed by the arrangement $T_1$, and the oil groove 53 is formed by the arrangement $T_2$. The oil groove 51 and the oil groove 53 have different functions depending on the rotation direction of the wet friction member 1 of the first invention. For this reason, the wet friction member 1 of the first invention may have different numbers of the arrangements $T_1$ and the arrangements $T_2$, but preferably has the same numbers thereof. Thus, the balance of the functions exhibited by the respective oil grooves can be maintained.

For example, it is assumed that the wet friction member 1 of the first invention is rotating clockwise. In this case, while penetrating from the inner peripheral side $S_I$ of the core plate 2 to the outer peripheral side $S_O$, the oil groove 51 functions as an oil groove that suppresses linear drainage of the lubricating oil in the centrifugal direction (in the direction linearly running from the rotation center P toward the outer peripheral side $S_O$). That is, since the oil groove 51 has a flow path that intersects the centrifugal direction and meanders, the lubricating oil that has flowed into the oil groove 51 is difficult to drain straight in the centrifugal direction. The oil groove 51 has a function of butting a part of the lubricating oil against the side 413 (see FIGS. 2A to 2C) to dam it, thereby causing the lubricating oil to ride on the surface of the first piece $G_1$. On the other hand, in the oil groove 53, the notch part 44L of the fourth piece $G_4$ functions as an enlarged opening part of the inner peripheral side $S_I$, and the notch part 43L of the third piece $G_3$ functions as an enlarged opening part of the outer peripheral side $S_O$. For this reason, a flow path that penetrates obliquely with respect to the centrifugal direction from the inner peripheral side $S_I$ to the outer peripheral side $S_O$ of the core plate 2 is formed, and has a function of smoothly discharging the lubricating oil in this inclination direction.

Further, it is assumed that the wet friction member 1 of the first invention is rotating counterclockwise. In this case, while penetrating from the inner peripheral side $S_T$ of the core plate 2 to the outer peripheral side $S_O$, the oil groove 53 functions as an oil groove that suppresses linear drainage of the lubricating oil in the centrifugal direction (in the direction linearly running from the rotation center P toward the outer peripheral side $S_O$). That is, since the oil groove 53 has a flow path that intersects the centrifugal direction and meanders, the lubricating oil that has flowed into the oil groove 53 is difficult to drain straight in the centrifugal direction. The oil groove 53 has a function of butting a part of the lubricating oil against the side 445 (see FIGS. 5A to 5C) to dam it, thereby causing the lubricating oil to ride on the surface of the fourth piece $G_4$. On the other hand, in the oil groove 51, the notch part 41L of the first piece $G_1$ functions as an enlarged opening part of the inner peripheral side $S_I$, and the notch part 42L of the second piece $G_2$ functions as an enlarged opening part of the outer peripheral side $S_O$. For this reason, a flow path that penetrates obliquely with respect to the centrifugal direction from the inner peripheral side $S_I$ to the outer peripheral side $S_O$ of the core plate 2 is formed, and has a function of smoothly discharging the lubricating oil in this inclination direction.

According to the arrangements $T_1$ and $T_2$, other oil grooves can be provided, in addition to the oil groove 51 and the oil groove 53. For example, the arrangement $T_1$ and the arrangement $T_2$ can be arranged adjacent to each other without interposing any other segment piece (see FIG. 1). In this case, an oil groove 52 can be provided between the second piece $G_2$ and the third piece $G_3$, and an oil groove 54 can be provided between the first piece $G_1$ and the fourth piece $G_4$. Between these, the oil groove 52 makes it possible to prevent the lubricating oil from staying between the surface of the second piece $G_2$ and the surface of the third piece $G_3$ without being discharged from the segment pieces. Further, the oil groove 54 makes it possible to prevent the lubricating oil from staying between the surface of the first piece $G_1$ and the surface of the fourth piece $G_4$ without being discharged from the segment pieces.

The flow path shapes of the oil groove 52 and the oil groove 54 are not limited. For example, the oil groove 52 can be formed into an appropriate shape by the side 422 of the second piece $G_2$ and the side 436 of the third piece $G_3$. As shown in FIG. 1, it can be formed into a straight channel having an approximately constant groove width and also having a flow path which runs straight toward the rotation center P of the wet friction member. Similarly, the flow path of the oil groove 54 can be formed into an appropriate shape by the side 416 of the first piece $G_1$ and the side 442 of the fourth piece $G_4$. For example, as shown in FIG. 1, it can be formed into a straight channel having an approximately constant groove width and also having a flow path which runs straight toward the rotation center P of the wet friction member.

1-3-7. Other Segment Pieces Arranged Between Arrangements $T_1$ and $T_2$

As described above, (1) the arrangements $T_1$ and the arrangements $T_2$ can be arranged adjacent to each other without interposing any other segment piece (see FIG. 1). Further, (2) the arrangements $T_1$ and the arrangements $T_2$ can be arranged via any other segment piece (see FIGS. 8 and 9). Further, (3) while some of the arrangements $T_1$ and $T_2$ are arranged directly adjacent to each other, any other segment piece can be interposed between the other of the arrangements $T_1$ and $T_2$. Among these, when the arrangements $T_1$ and the arrangements $T_2$ are arranged via any other segment piece, as in the above items (2) and (3), the numbers of the arrangements $T_1$ and the arrangements $T_2$ can be increased or decreased, and any other function that cannot be obtained by the arrangements $T_1$ and the arrangements $T_2$ can be imparted.

Figure 8:
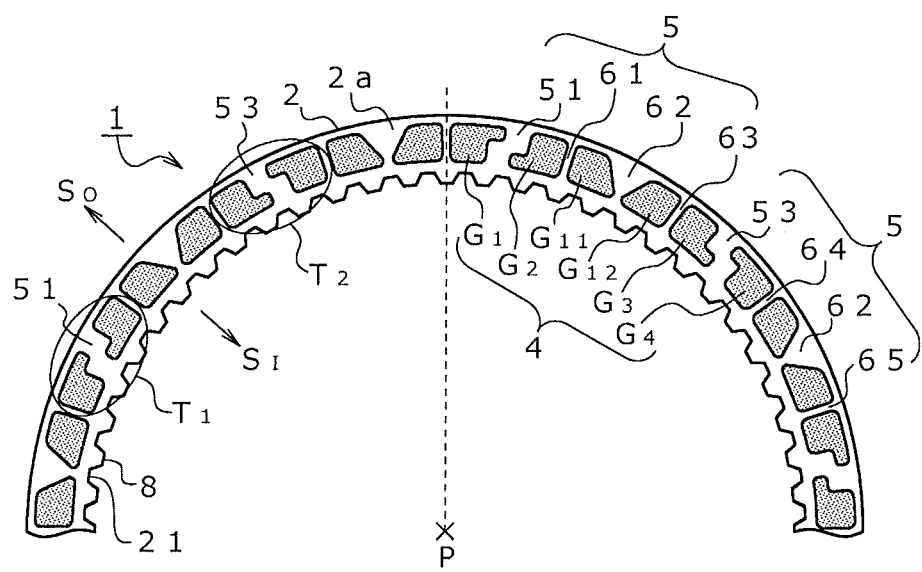
FIG. 8 is a partial plan view showing another example of the first wet friction member.

For example, the wet friction member 1 shown in FIG. 8 has one set of an eleventh piece $G_{11}$ and a twelfth piece $G_{12}$ between each of the arrangements $T_1$ and each of the arrangements $T_2$. Between these, the eleventh piece $G_{11}$ is a segment piece in which the upper right corner of an approximately rectangular piece is notched in an approximately triangular shape. The twelfth piece $G_{12}$ is a segment piece in which the upper left corner of an approximately rectangular piece is notched in an approximately triangular shape. The respective corners of the eleventh piece $G_{11}$ and the twelfth piece $G_{12}$ can be chamfered as necessary.

The eleventh piece $G_{11}$ and the twelfth piece $G_{12}$ are arranged via an oil groove 62, and the oil groove 62 has a shape in which the opening width gradually increases from the inner peripheral side $S_I$ toward the outer peripheral side $S_O$. As compared with the wet friction member 1 shown in FIG. 1, the wet friction member 1 shown in FIG. 8 can reduce the drag torque in the middle and high rotation regions (for example, a relative rotation speed of 1200 rpm or more), due to the fact that the proportion of the arrangements $T_1$ and the arrangements $T_2$ to the total number of the segment pieces is reduced, while the function by the oil groove 511 (to improve the lubricating oil discharging property) is added.

In the wet friction member 1 shown in FIG. 8, an oil groove 61 can be interposed between the second piece $G_2$ and the eleventh piece $G_{11}$, an oil groove 63 can be interposed between the twelfth piece $G_{12}$ and the third piece $G_3$, an oil groove 64 can be interposed between the fourth piece $G_4$ and the eleventh piece $G_{11}$, and an oil groove 65 can be interposed between the twelfth piece $G_{12}$ and the first piece $G_1$. The flow path shape of these oil grooves 5 is not limited. For example, the oil grooves 5 can be formed into a straight channel having an approximately constant groove width and also having a flow path which runs straight toward the rotation center P of the wet friction member.

Figure 9:
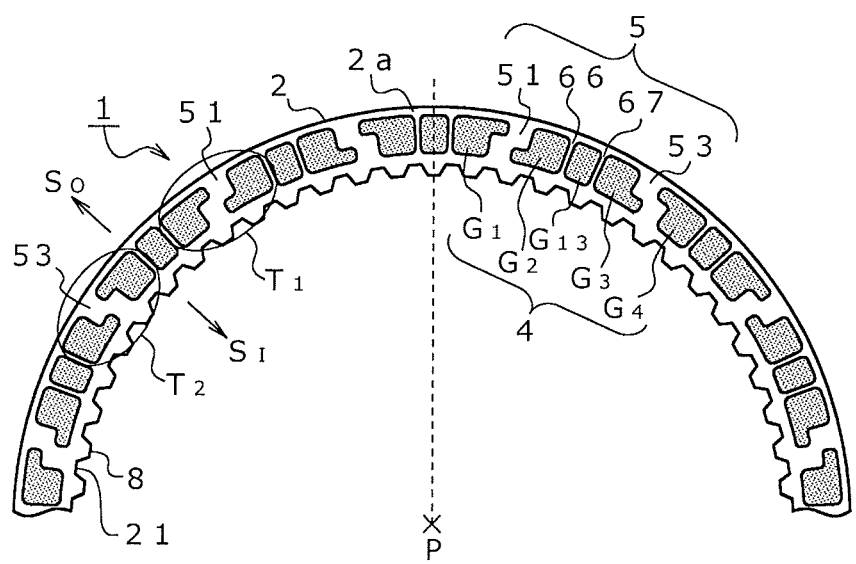
FIG. 9 is a partial plan view showing another example of the first wet friction member.

Further, for example, as shown in FIG. 9, by arranging one thirteenth piece $G_{13}$, which is the segment piece 4, between each of the arrangements $T_1$ and each of the arrangements $T_2$, many straight channels each having an approximately constant groove width and also having a flow path which runs straight toward the rotation center P of the wet friction member can be formed. The thirteenth piece $G_{13}$ can be an approximately rectangular segment piece without a notch part. Specifically, the thirteenth piece $G_{13}$ can be a segment piece which is not notched at any corner and has an approximately rectangular shape as a whole. The respective corners of the thirteenth piece $G_{13}$ can be chamfered as necessary. The thirteenth piece $G_{13}$ can be narrower than the first piece $G_1$ to the fourth piece $G_4$.

In the wet friction member 1 of the first invention, the number of the segment pieces 4 arranged on one main surface 2a of the core plate 2 is not limited, but can be, for example, 10 or more and 100 or less. This number is preferably 15 or more and 90 or less, more preferably 20 or more and 80 or less, particularly preferably 25 or more and 60 or less.

It is only necessary that for the four kinds of segment pieces (the first piece $G_1$ to the fourth piece $G_4$) described above, one set of the pieces included in the arrangement ($T_1$) and one set of the pieces included in the arrangement ($T_2$), i.e., a total of four pieces (one first piece $G_1$, one second piece $G_2$, one third piece $G_3$, and one fourth piece $G_4$) are included. More specifically, the four kinds of segment pieces are included preferably in 5% or more (which may be 100%), more preferably in 25 to 100%, still more preferably in 40 to 100% with respect to all the segment pieces 4.

The structure of the respective segment pieces 4 is not limited, and, for example, a structure obtained by hardening a paper body containing a base fiber and a filler with a curable resin can be used.

Between these, various synthetic fibers, regenerated fibers, inorganic fibers, natural fibers, etc. can be used as the base fiber. Specifically, cellulose fibers (pulp), acrylic fibers, aramid fibers, and the like are preferably used. Further, as the filler, cashew dust as a friction modifier, graphite and/or molybdenum disulfide as a solid lubricant, diatomaceous earth as an extender pigment, and the like can be used. These may be used alone, or a combination of two or more thereof may be used. Further, as a heat-curable resin, a phenol resin and/or a modified resin thereof can be used.

The segment pieces 4 are normally joined and fixed to the main surface 2a of the core plate 2. The method of joining the segment pieces 4 to the core plate 2 is not limited, and heat fusion, sticking (adhesion) via an adhesive or the like, and other methods can be used.

1-4. Oil Groove

The oil groove 5 is a groove serving as a flow path of the lubricating oil, which is formed as a gap between the two segment pieces 4 arranged so as to be separated from each other. In the wet friction member 1 of the first invention, the segment pieces 4 are spaced apart from each other and have oil grooves 5 as gaps therebetween. That is, the oil grooves 5 are through grooves penetrating to the inner peripheral side $S_I$ and the outer peripheral side $S_O$.

Each of the oil grooves 5 can function as a guide for discharging the lubricating oil supplied from the inner peripheral side $S_I$ of the wet friction member 1 of the first invention toward the outer peripheral side $S_O$. The number of the oil grooves 5 arranged on the main surface 2a is two or more according to the number of the segment pieces 4. In the case where all the segment pieces 4 are arranged so as to be separated from each other, the same number of the oil grooves 5 as the segment pieces 4 are formed.

The oil grooves 51 to 54 and the oil grooves 61 to 67 in the wet friction member 1 of the first invention are as described above.

The size of each part of the respective oil grooves is not limited. For example, the opening width $D_1$ (see FIG. 7) of the inner peripheral side $S_I$ of the oil groove 51 and the oil groove 53, respectively, is preferably 0.1 mm or more and 20 mm or less, more preferably 0.5 mm or more 15 mm or less, particularly preferably 1 mm or more and 10 mm or less. Further, the opening width $D_2$ (see FIG. 7) of the outer peripheral side $S_O$ of the oil groove 51, the oil groove 53, and the oil groove 62, respectively, is preferably 0.1 mm or more and 20 mm or less, more preferably 0.5 mm or more 15 mm or less, particularly preferably 1 mm or more and 10 mm or less. Further, a distance $D_3$ (see FIG. 7) between the first piece $G_1$ and the second piece $G_2$ constituting the oil groove 51 is not limited, but, for example, is preferably 0.1 mm or more and 10 mm or less, more preferably 0.2 mm or more 7 mm or less, particularly preferably 0.5 mm or more and 5 mm or less.

On the other hand, when the oil groove 52, the oil groove 54, and the oil grooves 61 to 67 are straight channels having an approximately constant groove width and also having a flow path which runs straight toward the rotation center P of the wet friction member, their width $D_4$ (see FIG. 7) is preferably 0.1 mm or more and 10 mm or less, more preferably 0.2 mm or more and 7 mm or less, particularly preferably 0.5 mm or more and 5 mm or less. Also, the approximately constant groove width means that the opening width of the inner peripheral side $S_I$ and the opening width of the outer peripheral side $S_O$ are the same, or, if the opening widths are different, means that, when the larger opening width is A mm, and the smaller opening width is B mm, $(A-B)/B \leq 0.1$.

2. Wet Friction Member of Second Invention

A wet friction member (1) of a second invention includes a core plate (2) formed in a flat ring shape and a friction part (3) arranged in a ring shape on a main surface (2a) of the core plate (2).

The friction part (3) includes a plurality of segment pieces (4) including at least a part of ($G_1$) to ($G_8$) and includes at least one of arrangements ($T_3$) to ($T_6$) (see FIGS. 10A to 18).

2-1. Core Plate

As an explanation about the core plate 2 used in the wet friction member 1 of the second invention, the explanation about the core plate 2 used in the wet friction member 1 of the first invention can be applied.

2-2. Friction Part

As an explanation about the friction part 3 used in the wet friction member 1 of the second invention, the explanation about the friction part 3 used in the wet friction member 1 of the first invention can be applied.

2-3. Segment Piece

As an explanation about the segment pieces 4 in the wet friction member 1 of the second invention, the explanation about the segment pieces 4 in the wet friction member 1 of the first invention can be applied, except for a fifth piece $G_5$ to an eighth piece $G_8$ and an arrangement $T_3$ to an arrangement $T_6$ involving them.

2-3-1. Fifth Piece $G_5$

Figure 10A:
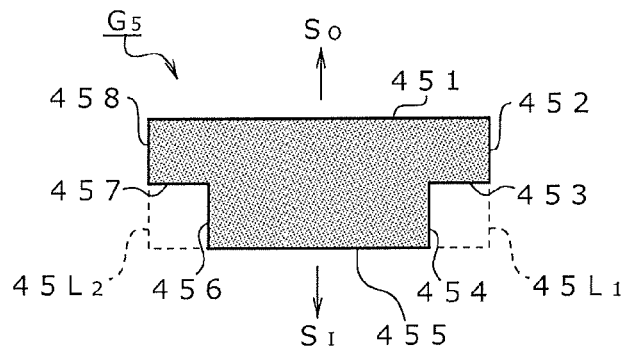
FIGS. 10A to 10C are explanatory views for explaining the shape and variations of a fifth piece.
Figure 10B:
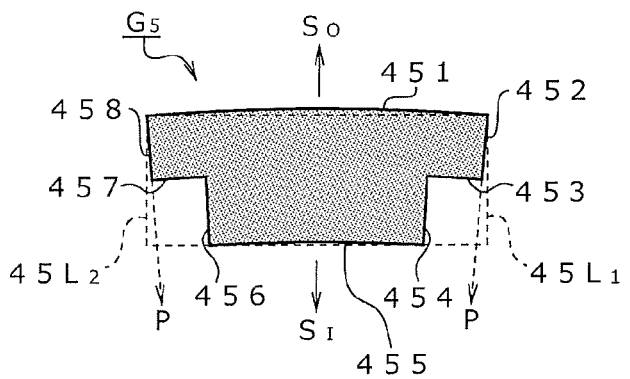
Figure 10C:
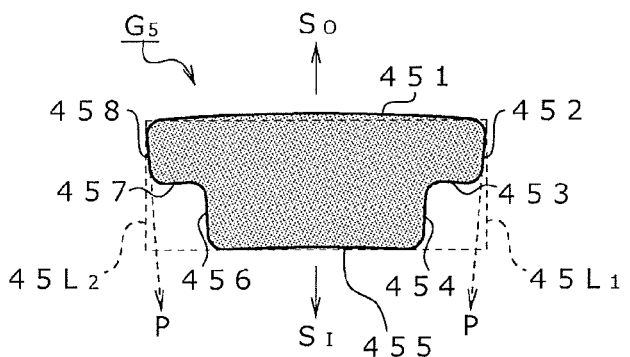

The fifth piece $G_5$ is a segment piece in which the lower right corner and lower left corner of an approximately rectangular piece are each notched in an approximately rectangular shape (see FIGS. 10A to 10C). That is, the segment piece has a notch part $45L_1$ at the lower right corner of an approximately rectangular piece and further has a notch part $45L_2$ at the lower left corner thereof.

As in the case of the first piece $G_1$ to the fourth piece $G_4$, the fifth piece $G_5$ can be formed only from straight lines, as shown in FIG. 10A. In this case, the fifth piece $G_5$ can include eight sides, i.e., sides 451 to 458.

Further, as shown in FIG. 10B, in the fifth piece $G_5$, the sides 451, 453, 455, and 457 can be formed by curved lines. Specifically, the sides can be formed by curved lines bulging toward the outer peripheral side $S_O$ so as to have a curvature according to the distance from the rotation center P. Further, in order that the oil grooves 5 have an approximately constant groove width, the sides 452 and 458 can be formed by straight lines inclined so that the rotation center P is positioned on the extension line thereof. Further, as shown in FIG. 10C, each corner part of the fifth piece $G_5$ can be chamfered into a curved shape.

The sizes of the notch parts $45L_1$ and $45L_2$ in the fifth piece $G_5$ are not limited. When the maximum width of the fifth piece $G_5$ is $W_1$ and the maximum width of the notch part $45L_1$ of the fifth piece $G_5$ is $W_2$ (see FIG. 14), the fifth piece $G_5$ can satisfy $0.05 \leq W_2/W_1 \leq 0.40$. In this range, an excellent drag torque reduction effect can be obtained. The $W_2/W_1$ can be further set to $0.07 \leq W_2/W_1 \leq 0.35$, further to $0.09 \leq W_2/W_1 \leq 0.32$, further to $0.10 \leq W_2/W_1 \leq 0.30$, further to $0.11 \leq W_2/W \leq 0.25$, and further to $0.12 \leq W_2/W_1 \leq 0.20$. The above-described ranges are similar for the notch part $45L_2$ of the fifth piece $G_5$. In each of these ranges, a better drag torque reduction effect can be obtained.

Further, when the maximum height of the fifth piece $G_5$ is $H_1$ and the maximum height of the notch part $45L_1$ of the fifth piece $G_5$ is $H_2$ (see FIG. 14), the fifth piece $G_5$ can satisfy $0.25 \leq H_2/H_1 \leq 0.75$. In this range, an excellent drag torque reduction effect can be obtained. The $H_2/H_1$ can be further set to $0.10 \leq H_2/H_1 \leq 0.80$, further to $0.15 \leq H_2/H_1 \leq 0.70$, further to $0.20 \leq H_2/H_1 \leq 0.65$, further to $0.22 \leq H_2/H_1 \leq 0.60$, further to $0.24 \leq H_2/H_1 \leq 0.50$, and further to $0.25 \leq H_2/H_1 \leq 0.40$. The above-described ranges are similar for the notch part $45L_2$ of the fifth piece $G_5$. In each of these ranges, a better drag torque reduction effect can be obtained.

2-3-2. Sixth Piece $G_6$

Figure 11A:
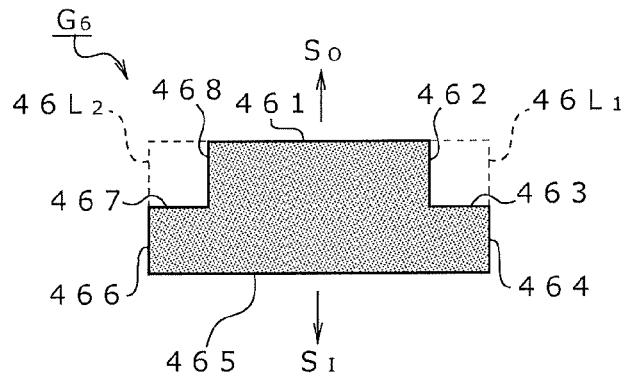
FIGS. 11A to 11C are explanatory views for explaining the shape and variations of a sixth piece.
Figure 11B:
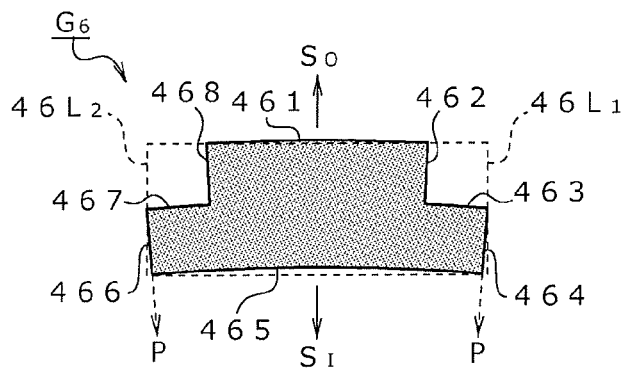
Figure 11C:
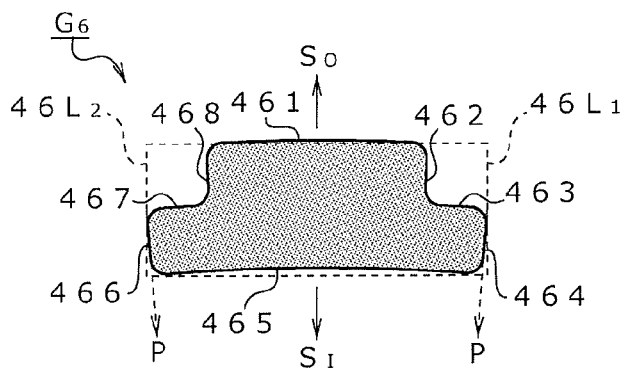

The sixth piece $G_6$ is a segment piece in which the upper right corner and upper left corner of an approximately rectangular piece are each notched in an approximately rectangular shape (see FIGS. 11A to 11C). That is, the segment piece has a notch part $46L_1$ at the upper right corner of an approximately rectangular piece, and further has a notch part $46L_2$ at the upper left corner thereof.

As shown in FIG. 11A, the sixth piece $G_6$ can be formed only from straight lines. In this case, the sixth piece $G_6$ can include eight sides, i.e., sides 461 to 468.

Further, as shown in FIG. 11B, in the sixth piece $G_6$, the sides 461, 463, 465, and 467 can be formed by curved lines. Specifically, the sides can be formed by curved lines bulging toward the outer peripheral side $S_O$ so as to have a curvature according to the distance from the rotation center P. Furthermore, in order that the oil grooves 5 have an approximately constant groove width, the sides 464 and 466 can be formed by straight lines inclined so that the rotation center P is positioned on the extension line thereof. Further, as shown in FIG. 11C, each corner part of the sixth piece $G_6$ can be chamfered into a curved shape.

Further, the sizes of the notch parts $46L_1$ and $46L_2$ in the sixth piece $G_6$ are not limited, and the description of $W_2/W_1$ and $H_2/H_1$ regarding the fifth piece $G_5$ can be directly applied to the sixth piece $G_6$.

2-3-3. Seventh Piece $G_7$

Figure 12A:
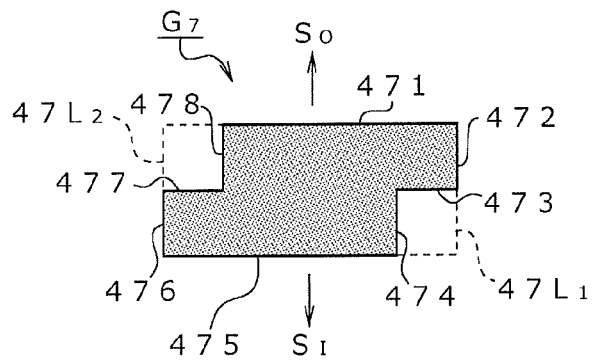
FIGS. 12A to 12C are explanatory views for explaining the shape and variations of a seventh piece.
Figure 12B:
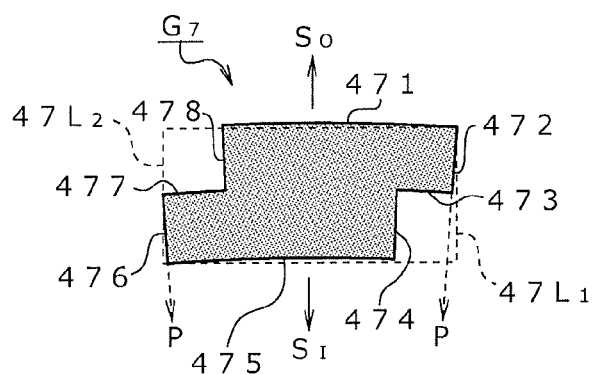
Figure 12C:
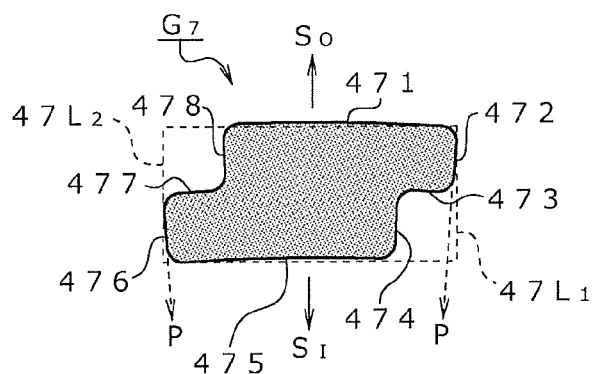

The seventh piece $G_7$ is a segment piece in which the lower right corner and upper left corner of an approximately rectangular piece are each notched in an approximately rectangular shape (see FIGS. 12A to 12C). That is, the segment piece has a notch part $47L_1$ at the lower right corner of an approximately rectangular piece, and further has a notch part $47L_2$ at the upper left corner thereof.

As shown in FIG. 12A, the seventh piece $G_7$ can be formed only from straight lines. In this case, the seventh piece $G_7$ can include eight sides, i.e., sides 471 to 478.

Further, as shown in FIG. 12B, in the seventh piece $G_7$, the sides 471, 473, 475, and 477 can be formed by curved lines. Specifically, the sides can be formed by curved lines bulging toward the outer peripheral side $S_O$ so as to have a curvature according to the distance from the rotation center P. Further, in order that the oil grooves 5 have an approximately constant groove width, the sides 472 and 476 can be formed by straight lines inclined so that the rotation center P is positioned on the extension line thereof. Further, as shown in FIG. 12C, each corner part of the seventh piece $G_7$ can be chamfered into a curved shape.

Further, the sizes of the notch parts $47L_1$ and $47L_2$ in the seventh piece $G_7$ are not limited, and the description of $W_2/W_1$ and $H_2/H_1$ regarding the fifth piece $G_5$ can be directly applied to the seventh piece $G_7$.

2-3-4. Eighth Piece $G_8$

Figure 13A:
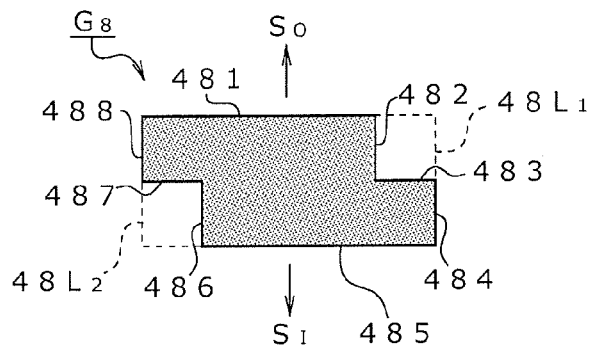
FIGS. 13A to 13C are explanatory views for explaining the shape and variations of an eighth piece.
Figure 13B:
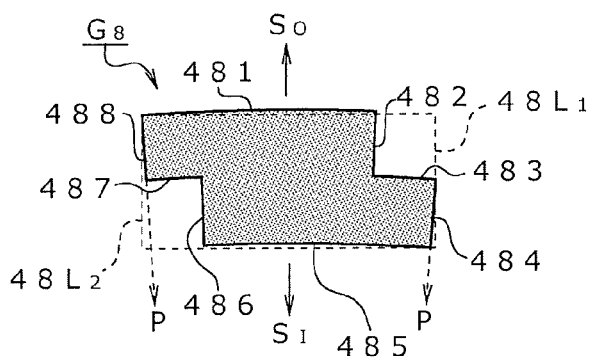
Figure 13C:
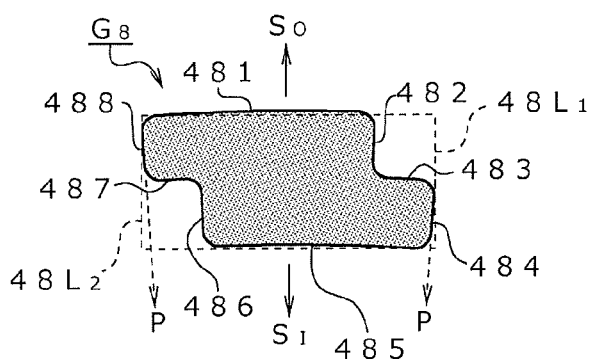
Figure 14:
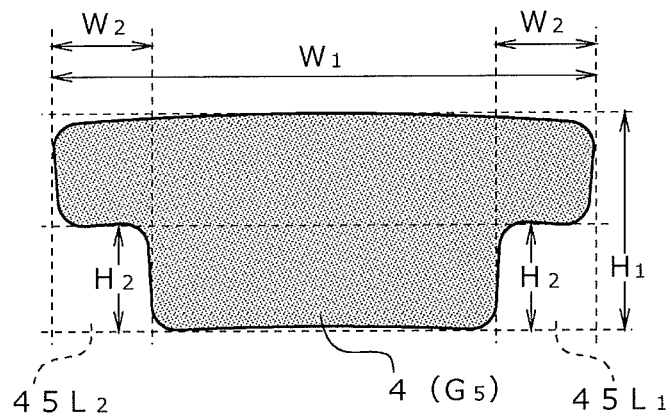
FIG. 14 is an explanatory view for explaining the sizes of a segment piece and notch parts.

The eighth piece $G_8$ is a segment piece in which the upper right corner and lower left corner of an approximately rectangular piece are each notched in an approximately rectangular shape (see FIGS. 13A to 13C). That is, the segment piece has a notch part $48L_1$ at the upper right corner of an approximately rectangular piece, and further has a notch part $48L_2$ at the lower left corner thereof.

As shown in FIG. 13A, the eighth piece $G_8$ can be formed only from straight lines. In this case, the eighth piece $G_8$ can include eight sides, i.e., sides 481 to 488.

Further, as shown in FIG. 13B, in the eighth piece $G_8$, the sides 481, 483, 485, and 487 can be formed by curved lines. Specifically, the sides can be formed by curved lines bulging toward the outer peripheral side $S_O$ so as to have a curvature according to the distance from the rotation center P. Furthermore, in order that the oil grooves 5 have an approximately constant groove width, the sides 484 and 488 can be formed by straight lines inclined so that the rotation center P is positioned on the extension line thereof. Further, as shown in FIG. 13C, each corner part of the eighth piece $G_8$ can be chamfered into a curved shape.

Further, the sizes of the notch parts $48L_1$ and $48L_2$ in the eighth piece $G_8$ are not limited, and the description of $W_2/W_1$ and $H_2/H_1$ regarding the fifth piece $G_5$ can be directly applied to the eighth piece $G_8$.

2-3-5. Fifth Piece $G_5$ and Sixth Piece $G_6$

Further, when the fifth piece $G_5$ and the sixth piece $G_6$ are included as the segment pieces in the friction part 3 at the same time, the maximum widths $W_1$ and the maximum heights $H_1$ of the segment pieces may be different, but are preferably the same. Further, the maximum widths $W_2$ and the maximum heights $H_2$ of the notch parts of the segment pieces of the fifth piece $G_5$ and the sixth piece $G_6$ may be different, but are preferably the same. In the case where they are the same, it is possible to make uniform the shapes of the oil grooves 5 formed to be defined by the two segment pieces. Therefore, it is possible to more reliably achieve the drag torque reduction while suppressing variations.

In addition, the fifth piece $G_5$ and the sixth piece $G_6$ may be asymmetric to each other but can be line-symmetric, in a plan view (FIG. 10A and FIG. 11A are each mirror-symmetric). In the case of the line-symmetric shape, since the fifth piece $G_5$ can be used as the sixth piece $G_6$ by reversing the fifth piece $G_5$, the fifth piece $G_5$ and the sixth piece $G_6$ can be manufactured simultaneously by single punching. Therefore, the segment pieces 4 are easily manufactured, which is an excellent cost merit.

2-3-6. Seventh Piece $G_7$ and Eighth Piece $G_8$

Further, when the seventh piece $G_7$ and the eighth piece $G_8$ are included as the segment pieces in the friction part 3 at the same time, the maximum widths $W_1$ and the maximum heights $H_1$ of the segment pieces may be different, but are preferably the same. Further, the maximum widths $W_2$ and the maximum heights $H_2$ of the notch parts of the segment pieces of the seventh piece $G_7$ and the eighth piece $G_8$ may be different, but are preferably the same. In the case where they are the same, it is possible to make uniform the shapes of the oil grooves 5 formed to be defined by the two segment pieces. Therefore, it is possible to more reliably achieve the drag torque reduction while suppressing variations.

Further, when the seventh piece $G_7$ and the eighth piece $G_8$ are included as the segment pieces in the friction part 3 at the same time, the seventh piece $G_7$ and the eighth piece $G_8$ may be asymmetric to each other but are preferably line-symmetric, in a plan view. That is, more specifically, it is preferable that the seventh piece $G_7$ and the eighth piece $G_8$ be mirror-symmetric to each other. When these are line-symmetric shapes, the shapes of the oil grooves 5 formed to be defined by the two segment pieces can be made uniform. Therefore, it is possible to more reliably achieve the drag torque reduction while suppressing variations. In addition, since the seventh piece $G_7$ can be used as the eighth piece $G_8$ by reversing the seventh piece $G_7$, the seventh piece $G_7$ and the eighth piece $G_8$ can be manufactured simultaneously by single punching. Therefore, the segment pieces 4 are easily manufactured, which is an excellent cost merit.

2-3-7. Arrangements $T_3$ to $T_6$

The wet friction member 1 of the second invention includes at least one of the arrangements $T_3$ to $T_6$ (see FIGS. 10A to 18).

2-3-8. Arrangement $T_3$

Figure 15:
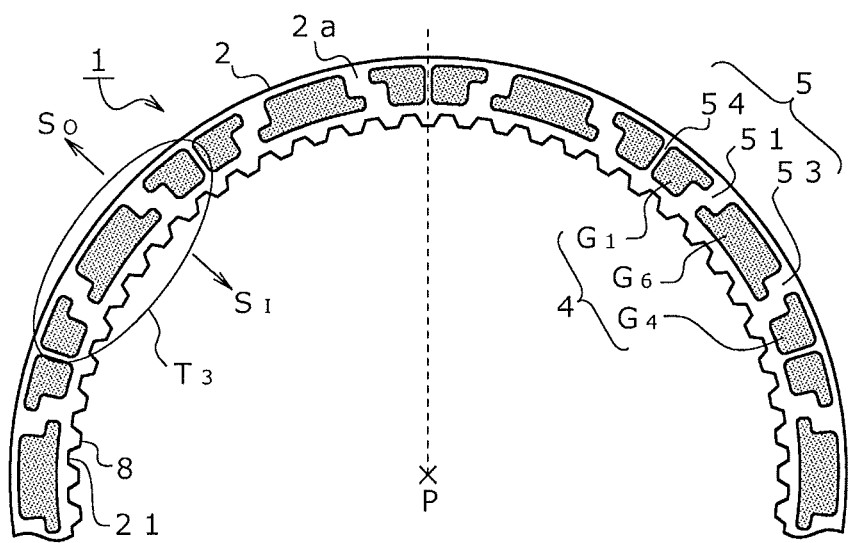
FIG. 15 is a partial plan view showing an example of a second wet friction member.

In the arrangement $T_3$, the first piece $G_1$, the sixth piece $G_6$, and the fourth piece $G_4$ are arranged in a manner that the right side of the first piece $G_1$ and the left side of the sixth piece $G_6$ face each other via an oil groove 5, and that the right side of the sixth piece $G_6$ and the left side of the fourth piece $G_4$ face each other via an oil groove 5 (see FIG. 15).

The oil groove 51 and the oil groove 53 are formed by the arrangement $T_3$. The oil groove 51 and the oil groove 53 have the same functions as the oil groove 51 and the oil groove 53, respectively, in the wet friction member 1 of the first invention. That is, the description of the arrangement $T_1$ and the oil groove 51 and the description of the arrangement $T_2$ and the oil groove 53 can be directly applied to the arrangement $T_3$.

Further, according to the arrangement $T_3$, other oil grooves can be provided, in addition to the oil groove 51 and the oil groove 53. Specifically, an oil groove 54 can be provided between the first piece $G_1$ and the fourth piece $G_4$ (see FIG. 15). The oil groove 54 makes it possible to prevent the lubricating oil from staying between the surface of the first piece $G_1$ and the surface of the fourth piece $G_4$ without being discharged from the segment pieces. The flow path shape of the oil groove 54 is not limited, and the flow path of the oil groove 54 can be formed into an appropriate shape by the side 416 of the first piece $G_1$ and the side 442 of the fourth piece $G_4$. For example, as shown in FIG. 15, it can be formed into a straight channel having an approximately constant groove width and also having a flow path which runs straight toward the rotation center P of the wet friction member.

Further, in the wet friction member 1 of the second invention, as in the case of the wet friction member 1 of the first invention, for example, any other segment piece can be interposed between the first piece $G_1$ and the fourth piece $G_4$. When the segment pieces are arranged with any other segment piece interposed therebetween, the number of the arrangements $T_3$ can be increased or decreased, and any other function that cannot be obtained by the arrangement $T_3$ can be imparted.

2-3-9. Arrangement $T_4$

Figure 16:
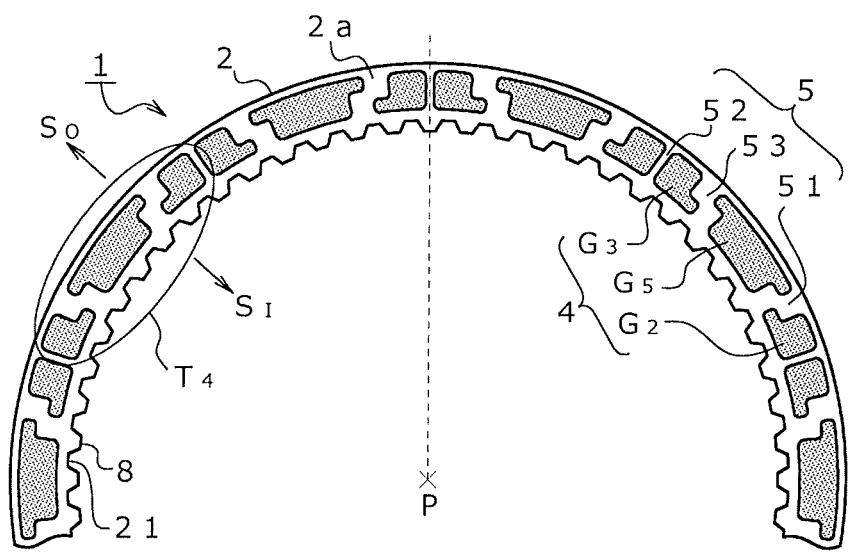
FIG. 16 is a partial plan view showing another example of the second wet friction member.
Figure 17:
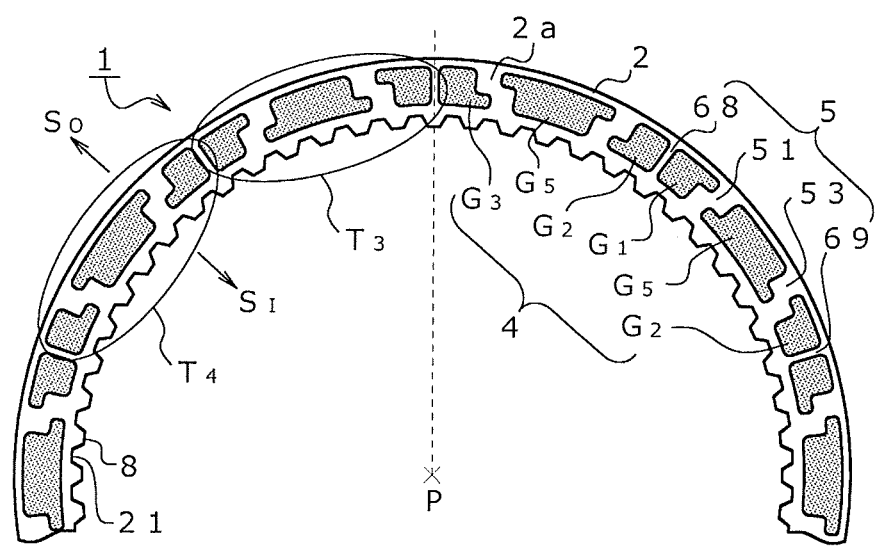
FIG. 17 is a partial plan view showing another example of the second wet friction member.

In the arrangement $T_4$, the third piece $G_3$, the fifth piece $G_5$, and the second piece $G_2$ are arranged in a manner that the right side of the third piece $G_3$ and the left side of the fifth piece $G_5$ face each other via an oil groove 5, and that the right side of the fifth piece $G_5$ and the left side of the second piece $G_2$ face each other via an oil groove 5 (see FIG. 16).

The oil groove 51 and the oil groove 53 are formed by the arrangement $T_4$. The oil groove 51 and the oil groove 53 have the same functions as the oil groove 51 and the oil groove 53, respectively, in the wet friction member 1 of the first invention. That is, the description of the arrangement $T_1$ and the oil groove 51 and the description of the arrangement $T_2$ and the oil groove 53 can be directly applied to the arrangement $T_4$.

Further, according to the arrangement $T_4$, other oil grooves can be provided, in addition to the oil groove 51 and the oil groove 53. Specifically, an oil groove 52 can be provided between the second piece $G_2$ and the third piece $G_3$ (see FIG. 16). The oil groove 52 makes it possible to prevent the lubricating oil from staying between the surface of the second piece $G_2$ and the surface of the third piece $G_3$ without being discharged from the segment pieces. The flow path shape of the oil groove 52 is not limited, and the oil groove 52 can be formed into an appropriate shape by the side 422 of the second piece $G_2$ and the side 436 of the third piece $G_3$. For example, as shown in FIG. 16, it can be formed into a straight channel having an approximately constant groove width and also having a flow path which runs straight toward the rotation center P of the wet friction member.

Further, in the wet friction member 1 of the second invention, as in the case of the wet friction member 1 of the first invention, for example, any other segment piece can be interposed between the second piece $G_2$ and the third piece $G_3$. When the segment pieces are arranged with any other segment piece interposed therebetween, the number of the arrangements $T_4$ can be increased or decreased, and any other function that cannot be obtained by the arrangement $T_4$ can be imparted.

Furthermore, in the wet friction member 1 of the second invention, the wet friction member 1 can include both the arrangement $T_3$ and the arrangement $T_4$ described above at the same time (see FIG. 17).

2-3-10. Arrangement $T_5$

Figure 18:
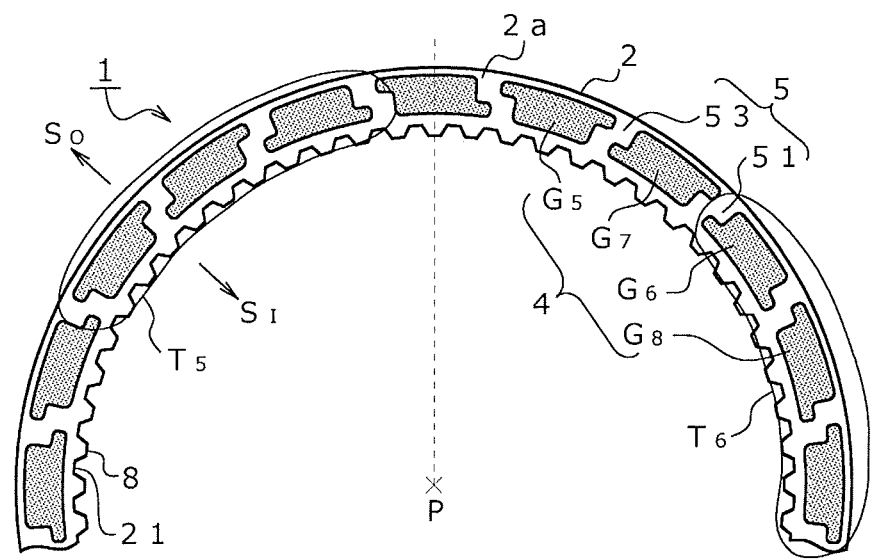
FIG. 18 is a partial plan view showing another example of the second wet friction member.
Figure 19:
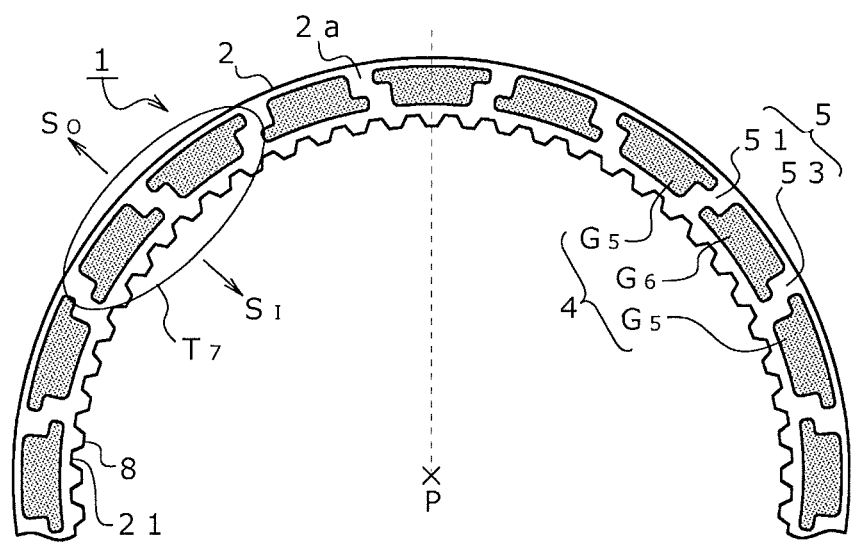
FIG. 19 is a partial plan view showing an example of a third wet friction member.

In the arrangement $T_5$, the fifth piece $G_5$, the seventh piece $G_7$ and the sixth piece $G_6$ are arranged in a manner that the right side of the fifth piece $G_5$ and the left side of the seventh piece $G_7$ face each other via an oil groove 5, and that the right side of the seventh piece $G_7$ and the left side of the sixth piece $G_6$ face each other via an oil groove 5 (see FIG. 18).

The oil groove 51 and the oil groove 53 are formed by the arrangement $T_5$. The oil groove 51 and the oil groove 53 have the same functions as the oil groove 51 and the oil groove 53, respectively, in the wet friction member 1 of the first invention. That is, the description of the arrangement $T_1$ and the oil groove 51 and the description of the arrangement $T_2$ and the oil groove 53 can be directly applied to the arrangement $T_5$.

Further, as a matter of course, in the wet friction member 1 of the second invention, the arrangement $T_3$ to the arrangement $T_5$ described above can be appropriately combined so that at least the arrangement $T_5$ is included.

2-3-11. Arrangement $T_6$

In the arrangement $T_6$, the sixth piece $G_6$, the eighth piece $G_8$, and the fifth piece $G_5$ are arranged in a manner that the right side of the sixth piece $G_6$ and the left side of the eighth piece $G_8$ face each other via an oil groove 5, and that the right side of the eighth piece $G_8$ and the left side of the fifth piece $G_5$ face each other via an oil groove 5 (see FIG. 18).

The oil groove 51 and the oil groove 53 are formed by the arrangement $T_6$. The oil groove 51 and the oil groove 53 have the same functions as the oil groove 51 and the oil groove 53, respectively, in the wet friction member 1 of the first invention. That is, the description of the arrangement $T_1$ and the oil groove 51 and the description of the arrangement $T_2$ and the oil groove 53 can be directly applied to the arrangement $T_6$.

Further, as a matter of course, in the wet friction member 1 of the second invention, the arrangement $T_3$, the arrangement $T_4$, and the arrangement $T_6$ described above can be appropriately combined so that at least the arrangement $T_6$ is included.

In the wet friction member 1 of the second invention, the number of the segment pieces 4 arranged on one main surface $2a$ of the core plate 2 is not limited, and can be similar as in the case of the wet friction member 1 of the first invention. Further, the structures of the respective segment pieces 4 are not limited and can be similar as in the case of the wet friction member 1 of the first invention described above. The oil grooves 5 are also similar as in the case of the wet friction member 1 of the first invention.

3. Wet Friction Member of Third Invention

A wet friction member (1) of a third invention includes a core plate (2) formed in a flat ring shape and a friction part (3) arranged in a ring shape on a main surface ($2a$) of the core plate (2).

The friction part (3) has a plurality of segment pieces (4) including ($G_5$) and ($G_6$), and the fifth piece ($G_5$) and the sixth piece ($G_6$) are arranged adjacent to each other via an oil groove (5) (arrangement $T_7$) (see FIGS. 10A to 10C, 11A to 11C, and 19).

In this manner, the fifth piece $G_5$ and the sixth piece $G_6$ are arranged adjacent to each other via the oil groove 5, whereby the oil groove 51 and the oil groove 53 are formed. The oil groove 51 and the oil groove 53 have the same functions as the oil groove 51 and the oil groove 53, respectively, in the wet friction member 1 of the first invention. That is, the description of the arrangement $T_1$ and the oil groove 51 described above and the description of the arrangement $T_2$ and the oil groove 53 described above can be directly applied.

As an explanation about the core plate 2 used in the wet friction member 1 of the third invention, the explanation about the core plate 2 used in the wet friction member 1 of the first invention can be applied.

As an explanation about the friction part 3 used in the wet friction member 1 of the third invention, the explanation about the friction part 3 used in the wet friction member 1 of the first invention can be applied.

Further, as an explanation about the segment pieces 4 in the wet friction member 1 of the third invention, the explanation about the fifth piece $G_5$ and the sixth piece $G_6$ in the wet friction member 1 of the second invention can be applied.

EXAMPLES

Hereinafter, the present invention will be explained by way of examples. Explanations common to the examples will be omitted.

1. Adjustment of Wet Friction Member

Example 1

A wet friction member 1 of Example 1 was obtained using the following elements (see FIGS. 1A and 1B).

A core plate 2 is in a flat ring shape (outer diameter $R_1$=158 mm, inner diameter $R_2$=144 mm, ratio $R_1/R_2$=1.10) and has spline teeth 8 (engagement teeth 8) protruding from the inner periphery. The following segment pieces 4 were joined to both main surfaces 2a (front main surface 2a and back main surface 2a) of the core plate 2 to obtain a wet friction member of Example 1.

The segment pieces 4 are configured in a manner that a plurality of segment pieces are arranged in a ring shape with oil grooves interposed therebetween.

As the segment pieces 4, the following four different kinds of segment pieces (first piece $G_1$ to fourth piece $G_4$) were used:

first piece $G_1$: a segment piece in which the lower right corner of an approximately rectangular piece was notched in an approximately rectangular shape (see FIG. 2C);

second piece $G_2$: a segment piece in which the upper left corner of an approximately rectangular piece was notched in an approximately rectangular shape (see FIG. 3C);

third piece $G_3$: a segment piece in which the upper right corner of an approximately rectangular piece was notched in an approximately rectangular shape (see FIG. 4C); and fourth piece $G_4$: a segment piece in which the lower left corner of an approximately rectangular piece was notched in an approximately rectangular shape (see FIG. 5C).

Provided that the dimensions of the respective parts of the respective segment pieces are as follows.

Maximum width $W_1$ of segment piece=9.6 mm
Maximum height $H_1$ of segment piece=8.9 mm
Maximum width $W_2$ of one of notch parts=2.5 mm
Maximum height $H_2$ of one of notch parts=5.0 mm In addition, the first piece $G_1$ and the fourth piece $G_4$ are mirror-symmetric, and the first piece $G_1$ is reversed so as to be used as the fourth piece $G_4$. Likewise, the second piece $G_2$ and the third piece $G_3$ are mirror-symmetric, and the second piece $G_2$ is reversed so as to be used as the third piece $G_3$.

The segment pieces consist only of four kinds of pieces: the first piece $G_1$ to the fourth piece $G_4$, and these segment pieces are arranged clockwise in the order of the first piece $G_1$, the second piece $G_2$, the third piece $G_3$, and the fourth pieces $G_4$, whereby the arrangement $T_1$ and the arrangement $T_2$ are formed. Specifically, in the arrangement $T_1$, the first piece $G_1$ and the second piece $G_2$ are arranged in a manner that the right side of the first piece $G_1$ and the left side of the second piece $G_2$ face each other via the oil groove 51. In the arrangement $T_2$, the third piece $G_3$ and the fourth piece $G_4$ are arranged in a manner that the right side of the third piece $G_3$ and the left side of the fourth piece $G_4$ face each other via the oil groove 53.

Furthermore, four segment pieces included in the alternately-arranged arrangement $T_1$ and arrangement $T_2$ were set as one group. This group was repeated 10 times to form a friction part 3 consisting of 40 segment pieces (group consisting of four kinds of segment pieces×10). The respective segment pieces are opposed via oil grooves. That is, oil grooves are arranged among all the adjacent segment pieces. Therefore, the friction part 3 on one main surface 2a includes 40 segment pieces and 40 oil grooves, and the friction parts 3 of the same arrangement are formed on both the front main surface 2a and the back main surface 2a.

Figure 7:
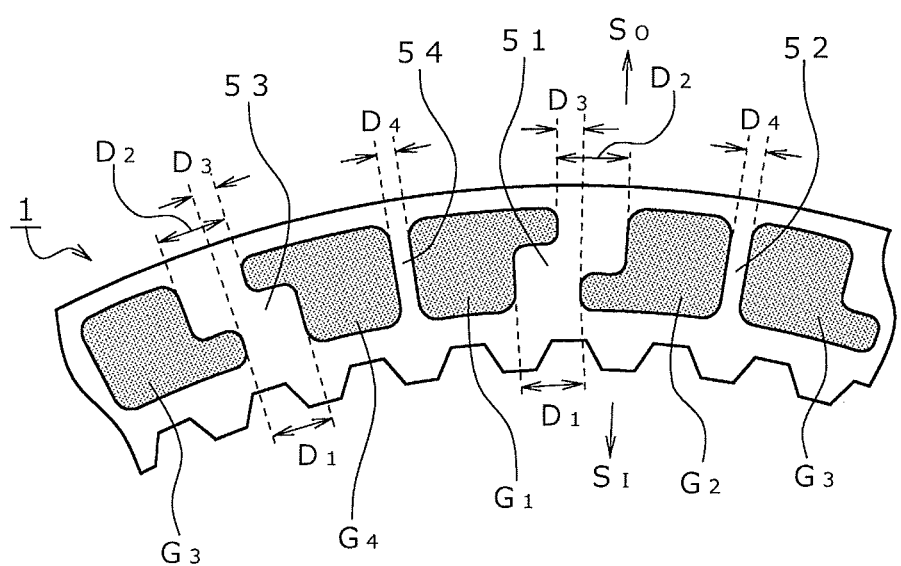
FIG. 7 is an explanatory view for explaining oil grooves.

Further, in the wet friction member 1 of Example 1, the opening widths and groove widths of the respective oil grooves, and the distances between the respective pieces are as follows (see FIG. 7).

Opening width $D_1$ of inner peripheral side $S_I$ of oil groove 51=6.5 mm

Opening width $D_2$ of outer peripheral side $S_O$ of oil groove 51=6.5 mm

Distance $D_3$ between first piece $G_1$ and second piece $G_2$=2 mm

Opening width $D_1$ of inner peripheral side $S_I$ of oil groove 53=6.5 mm

Opening width $D_2$ of outer peripheral side $S_O$ of oil groove 53=6.5 mm

Distance $D_3$ between third piece $G_3$ and fourth piece $G_4$=2 mm

Width $D_4$ of oil groove 52 and oil groove 54=2 mm

Each of the segment pieces 4 is formed by making a paper body from fiber bases such as pulp and an aramid fiber, a friction modifier such as cashew dust, a filler such as diatomaceous earth and impregnating the paper body with a curable resin to cure the paper body. The respective segment pieces 4 are joined to the main surfaces 2a of the core plate 2 by pressurizing and heating.

Example 2

A wet friction member 1 of Example 2 was obtained using the following elements (see FIG. 8).

The core plate 2 is identical with that used in Example 1.

The segment pieces 4 are configured in a manner that a plurality of segment pieces are arranged in a ring shape with oil grooves interposed therebetween. As the segment pieces 4, the following six different kinds of segment pieces (the first piece $G_1$ to the fourth piece $G_4$, and the eleventh piece $G_{11}$ and the twelfth piece $G_{12}$) were used. Among these, the first piece $G_1$ to the fourth piece $G_4$ are identical with those used in Example 1. On the other hand, the eleventh piece $G_{11}$ and the twelfth piece $G_{12}$ are as follows.

Eleventh piece $G_{11}$: a segment piece in which the upper right corner of an approximately rectangular piece was notched in an approximately triangular shape (see FIG. 8)

Twelfth piece $G_{12}$: a segment piece in which the upper left corner of an approximately rectangular piece was notched in an approximately triangular shape (see FIG. 8).

The segment pieces 4 consist only of six kinds of pieces: the first piece $G_1$ to the fourth piece $G_4$, and the eleventh piece $G_{11}$ and the twelfth piece $G_{12}$. These segment pieces were arranged clockwise in the order of the first piece $G_1$, the second piece $G_2$, the eleventh piece $G_{11}$, the twelfth piece $G_{12}$, the third piece $G_3$, the fourth piece $G_4$, the eleventh piece $G_{11}$, and the twelfth piece $G_{12}$. These eight segment pieces were set as one group, and this group was repeated 5 times to form a friction part 3 consisting of 40 segment pieces. The respective segment pieces are opposed via oil grooves. That is, oil grooves are arranged among all the adjacent segment pieces. Therefore, the friction part 3 on one main surface 2a includes 40 segment pieces and 40 oil grooves, and the friction parts 3 of the same arrangement are formed on both the front main surface 2a and the back main surface 2a.

Accordingly, this regular arrangement of the eight segment pieces includes the arrangement $T_1$ and the arrangement $T_2$. Specifically, in the arrangement $T_1$, the first piece $G_1$ and the second piece $G_2$ are arranged in a manner that the right side of the first piece $G_1$ and the left side of the second piece $G_2$ face each other via the oil groove 51. In the arrangement $T_2$, the third piece $G_3$ and the fourth piece $G_4$ are arranged in a manner that the right side of the third piece $G_3$ and the left side of the fourth piece $G_4$ face each other via the oil groove 53.

Further, the eleventh piece $G_{11}$ and the twelfth piece $G_{12}$ are arranged via an oil groove 62, and the oil groove 62 has a shape in which the opening width gradually increases from the inner peripheral side $S_I$ toward the outer peripheral side $S_O$.

Further, an oil groove 61 is interposed between the second piece $G_2$ and the eleventh piece $G_{11}$, an oil groove 63 is interposed between the twelfth piece $G_{12}$ and the third piece $G_3$, an oil groove 64 is interposed between the fourth piece $G_4$ and the eleventh piece $G_{11}$, and an oil groove 65 is interposed between the twelfth piece $G_{12}$ and the first piece $G_1$. All the oil grooves are straight channels having an approximately constant groove width and also having a flow path which runs straight toward a rotation center P of the wet friction member.

The material configuration of each of the segment pieces 4 is identical with that of Example 1.

Further, in the wet friction member 1 of Example 2, the opening widths and groove widths of the respective oil grooves, and the distances between the respective pieces are as follows (see FIGS. 7 and 8).

Opening width $D_1$ of inner peripheral side $S_I$ of oil groove 51=6.5 mm

Opening width $D_2$ of outer peripheral side $S_O$ of oil groove 51=6.5 mm

Distance $D_3$ between first piece $G_1$ and second piece $G_2$=2 mm

Opening width $D_1$ of inner peripheral side $S_I$ of oil groove 53=6.5 mm

Opening width $D_2$ of outer peripheral side $S_O$ of oil groove 53=6.5 mm

Distance $D_3$ between third piece $G_3$ and fourth piece $G_4$=2 mm

Opening width of inner peripheral side $S_I$ of oil groove 62=2 mm

Opening width of outer peripheral side $S_O$ of oil groove 62=7 mm

Width $D_4$ of oil groove 61, oil groove 63, oil groove 64, and oil groove 65=2 mm Comparative Example 1

Figure 20:
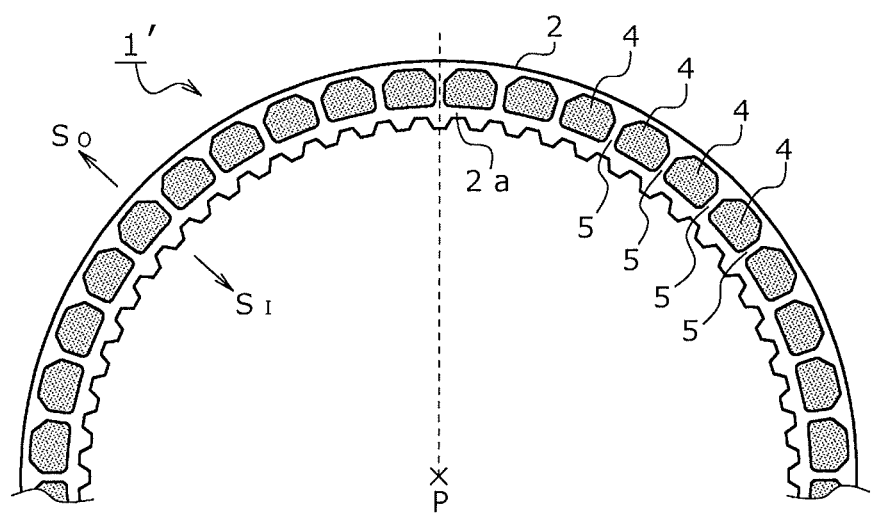
FIG. 20 is a partial plan view showing a wet friction member of Comparative Example 1.

A wet friction member of Comparative Example 1 was obtained using the following elements (see FIG. 20).

The core plate 2 is identical with that used in Example 1. The segment pieces 4 are configured in a manner that a plurality of segment pieces are arranged in a ring shape with oil grooves interposed therebetween.

As the segment piece 4, the following one kind of segment piece was used:
segment piece 4: a segment piece in which the upper right corner and upper left corner of an approximately rectangular piece were each notched in an approximately triangular shape (see FIG. 20).

Provided that the dimensions of the respective parts of the respective segment pieces are as follows.

Maximum width $W_1$ of segment piece=9.6 mm

Maximum height $H_1$ of segment piece=8.9 mm

The friction part 3 includes 40 segment pieces 4. The respective segment pieces face each other via oil grooves, and the friction part 3 on one main surface 2a includes 40 segment pieces and 40 oil grooves, and the friction parts 3 of the same arrangement are formed on both the front main surface 2a and the back main surface 2a.

In the wet friction member 1 of Comparative Example 1, the widths of the oil grooves are as follows.

Opening width of inner peripheral side $S_1$ of oil groove 5=2 mm

Opening width of outer peripheral side $S_O$ of oil groove 5=7 mm

The material configuration of each of the segment pieces 4 is identical with that of Example 1.

Comparative Example 2

Figure 21:
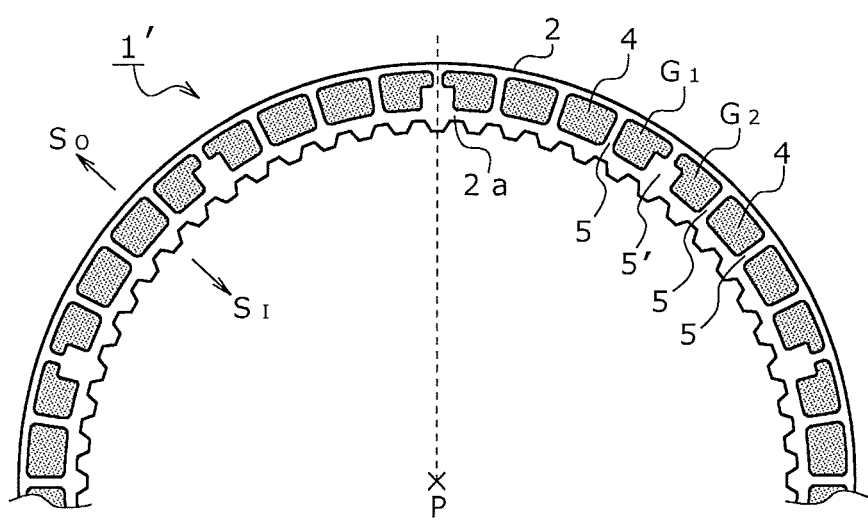
FIG. 21 is a partial plan view showing a wet friction member of Comparative Example 2.

A wet friction member of Comparative Example 2 was obtained using the following elements (see FIG. 21).

The core plate 2 is identical with that used in Example 1. The segment pieces 4 are configured in a manner that a plurality of segment pieces are arranged in a ring shape with oil grooves interposed therebetween.

As the segment pieces 4, the following three different kinds of segment pieces (the first piece $G_1$, the fourth piece $G_4$, and any other piece 4) were used. Among these, the first piece $G_1$ and the fourth piece $G_4$ are identical with those used in Example 1. The other piece 4 is an approximately rectangular piece.

Provided that the dimensions of the respective parts of the respective segment pieces are as follows.

Maximum width $W_1$ of segment piece=9.6 mm

Maximum height $H_1$ of segment piece=8.9 mm

Maximum width $W_2$ of notch part=2.5 mm

Maximum height $H_2$ of notch part=5.0 mm

Incidentally, the first piece $G_1$ and the fourth piece $G_4$ are mirror-symmetric, and the first piece $G_1$ is reversed to be used as the fourth piece $G_4$.

The segment pieces arranged in the order of any other piece 4, the first piece $G_1$, the fourth piece $G_4$, and any other piece 4 were set as one group. This group was repeated 10 times to form a friction part 3 consisting of 40 segment pieces. The respective segment pieces are opposed via oil grooves. That is, oil grooves are arranged among all the adjacent segment pieces. Therefore, the friction part 3 on one main surface 2a includes 40 segment pieces and 40 oil grooves, and the friction parts 3 of the same arrangement are formed on both the front main surface 2a and the back main surface 2a.

In addition, in the wet friction member 1 of Comparative Example 2, the opening widths of the respective oil grooves are as follows.

Width of oil groove 5=2 mm

Opening width of inner peripheral side $S_1$ of oil groove 5'=7 mm

Opening width of outer peripheral side $S_O$ of oil groove 5'=2 mm

The material configuration of each of the segment pieces 4 is identical with that of Example 1.

Comparative Example 3

Figure 22:
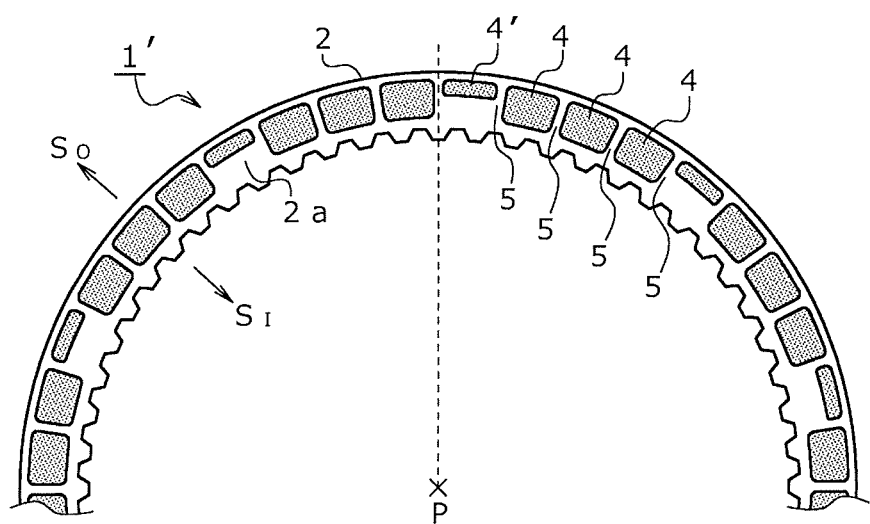
FIG. 22 is a partial plan view showing a wet friction member of Comparative Example 3.

A wet friction member of Comparative Example 3 was obtained using the following elements (see FIG. 22).

The core plate 2 is identical with that used in Example 1. The segment pieces 4 are configured in a manner that a plurality of segment pieces are arranged in a ring shape with oil grooves interposed therebetween.

As the segment pieces 4, the following two different kinds of segment pieces (4 and 4') were used:
segment piece 4: an approximately rectangular piece; and
segment piece 4': a piece in which the inner peripheral side $S_T$ of the segment piece 4 was cut by 5.0 mm from the lower end.

Provided that the dimensions of the respective parts of the respective segment pieces are as follows.

Maximum width $W_1$ of segment piece=9.6 mm

Maximum height $H_1$ of segment piece=8.9 mm

Maximum height of notch part=5.0 mm

The segment pieces arranged in the order of the piece 4', the piece 4, the piece 4 and the piece 4 were set as one group. This group was repeated 10 times to form a friction part 3 consisting of 40 segment pieces. The respective segment pieces are opposed via oil grooves. That is, oil grooves are arranged among all the adjacent segment pieces. Therefore, the friction part 3 on one main surface 2a includes 40 segment pieces and 40 oil grooves, and the friction parts 3 of the same arrangement are formed on both the front main surface 2a and the back main surface 2a.

In addition, in the wet friction member 1 of Comparative Example 3, the widths of the respective oil grooves 5 are 2 mm.

Further, the material configuration of each of the segment pieces 4 is identical with that of Example 1.

2. Measurement of Drag Torque

Four wet friction members each according to Examples 1 and 2 and Comparative Examples 1 to 3 in the above item 1 were used to measure the drag torque with an SAE friction tester at a rotation speed between 500 and 3000 rpm under the following conditions. The obtained results are shown in a graph in FIG. 23 (FIG. 23 shows that the drag torque is larger toward the upper side of the vertical axis).

Four wet friction members as test specimens were set in an environment using AutoAtic Transmission Fluid ("ATF" is a registered trademark of Idemitsu Kosan Co., Ltd., but is used hereinafter as its abbreviation regardless of this registered trademark) (oil temperature: 40° C., ATF oil amount: 1000 mL/min (shaft center lubrication) and pack clearance: 0.20 mm/sheet). The rotation speed was changed to between 500 rpm and 3000 rpm to measure the drag torques (N·m) at six points, i.e., 500 rpm, 1000 rpm, 1500 rpm, 2000 rpm, 2500 rpm, and 3000 rpm.

3. Effects of Examples

Figure 23:
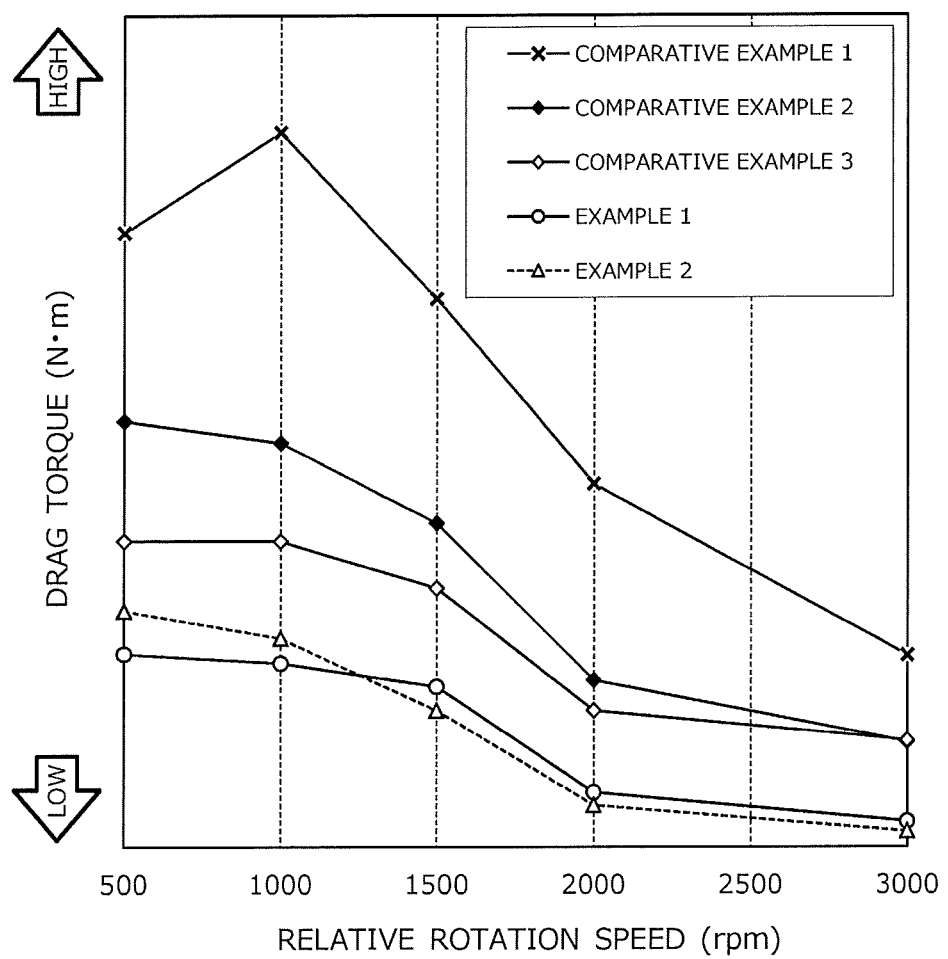
FIG. 23 is a graph showing the correlation between the drag torque of each of the wet friction members and the relative rotation speed.

From the result of FIG. 23, it can be seen that the structure of Comparative Example 1 gives a larger drag torque in a region where the relative rotation speed is low (in particular, 500 to 1500 rpm), than the drag torque in a region where the relative rotation speed is high. In contrast, it can be seen that the structure of Comparative Example 2 can reduce the drag torque from the region where the relative rotation speed is high to the region where the relative rotation speed is low, as compared with Comparative Example 1. In particular, a great drag torque reduction effect can be obtained in the region with a low relative rotation speed. Further, the structure of Comparative Example 3 can reduce the drag torque from the region where the relative rotation speed is high to the region where the relative rotation speed is low, as compared with Comparative Example 2. In particular, a greater drag torque reduction effect can be obtained in the region with a low relative rotation speed.

It can be seen that the structure of Example 1 can further reduce the drag torque thoroughly from the region where the relative rotation speed is high to the region where the relative rotation speed is low, as compared with Comparative Examples 1 to 3. In particular, it can be seen that a greater drag torque reduction effect can be obtained in the region with a low relative rotation speed. It can be seen that a flatter drag torque can be achieved as a whole.

The present invention is not limited to the above-described specific examples, and can be variously modified within the scope of the present invention depending on the purpose and intended use.

The intended use of the wet friction member according to the present invention is not particularly limited, and the wet friction member is widely applied to automobiles (four-wheeled vehicles, two-wheeled vehicles, etc.), railway vehicles, ships, airplanes, and the like. Among them, the wet friction member is suitably used for automatic transmissions (automatic transmissions, ATs) as automobile supplies. Only one wet friction member may be used in the transmissions, or a plurality of them may be used therein. However, it is preferable that a plurality of wet friction members be used. The use of a larger number of wet friction members in one transmission can provide a cumulatively large effect. That is, the drag torque can be more effectively reduced in a wet multiple disc clutch including a larger number of wet friction members.

What is claimed is:

1. A wet friction member comprising a core plate formed in a flat ring shape and a friction part arranged in a ring shape on a main surface of the core plate,
   wherein the friction part comprises a plurality of segment pieces including the following segment pieces ($G_1$) to ($G_4$):
   ($G_1$) a first piece in which a lower right corner of an approximately rectangular piece is notched in an approximately rectangular shape;
   ($G_2$) a second piece in which an upper left corner of an approximately rectangular piece is notched in an approximately rectangular shape;
   ($G_3$) a third piece in which an upper right corner of an approximately rectangular piece is notched in an approximately rectangular shape; and
   ($G_4$) a fourth piece in which a lower left corner of an approximately rectangular piece is notched in an approximately rectangular shape;
   and the friction part has the following arrangements ($T_1$) and ($T_2$):
   ($T_1$) an arrangement in which the first piece and the second piece are arranged in a manner that a right side of the first piece and a left side of the second piece face each other via an oil groove; and
   ($T_2$) an arrangement in which the third piece and the fourth piece are arranged in a manner that a right side of the third piece and a left side of the fourth piece face each other via an oil groove.

2. The wet friction member according to claim 1, wherein all of the segment pieces of the pieces ($G_1$) to ($G_4$) satisfy $0.10 \leq W_2/W_1 \leq 0.80$, when a maximum width of each piece is $W_1$ and a maximum width of each notch part is $W_2$.

3. The wet friction member according to claim 1, wherein all of the segment pieces of the pieces ($G_1$) to ($G_4$) satisfy $0.25 \leq H_2/H_1 \leq 0.75$, when a maximum height of each piece is $H_1$ and a maximum height of each notch part is $H_2$.

4. A wet friction member comprising a core plate formed in a flat ring shape and a friction part arranged in a ring shape on a main surface of the core plate,
   wherein the friction part comprises a plurality of segment pieces including at least three pieces of the following segment pieces ($G_1$) to ($G_8$):
   ($G_1$) a first piece in which a lower right corner of an approximately rectangular piece is notched in an approximately rectangular shape;

($G_2$) a second piece in which an upper left corner of an approximately rectangular piece is notched in an approximately rectangular shape;

($G_3$) a third piece in which an upper right corner of an approximately rectangular piece is notched in an approximately rectangular shape;

($G_4$) a fourth piece in which a lower left corner of an approximately rectangular piece is notched in an approximately rectangular shape;

($G_5$) a fifth piece in which a lower right corner and a lower left corner of an approximately rectangular piece are each notched in an approximately rectangular shape;

($G_6$) a sixth piece in which an upper right corner and an upper left corner of an approximately rectangular piece are each notched in an approximately rectangular shape;

($G_7$) a seventh piece in which a lower right corner and an upper left corner of an approximately rectangular piece are each notched in an approximately rectangular shape; and ($G_8$) an eighth piece in which an upper right corner and a lower left corner of an approximately rectangular piece are each notched in an approximately rectangular shape;

and the friction part has at least one arrangement selected from a group consisting of the following arrangements ($T_3$) to ($T_6$):

($T_3$) an arrangement in which the first piece, the sixth piece, and the fourth piece are arranged in a manner that a right side of the first piece and a left side of the sixth piece face each other via an oil groove and that a right side of the sixth piece and a left side of the fourth piece face each other via an oil groove;

($T_4$) an arrangement in which the third piece, the fifth piece, and the second piece are arranged in a manner that a right side of the third piece and a left side of the fifth piece face each other via an oil groove and that a right side of the fifth piece and a left side of the second piece face each other via an oil groove;

($T_5$) an arrangement in which the fifth piece, the seventh piece, and the sixth piece are arranged in a manner that a right side of the fifth piece and a left side of the seventh piece face each other via an oil groove and that a right side of the seventh piece and a left side of the sixth piece face each other via an oil groove; and ($T_6$) an arrangement in which the sixth piece, the eighth piece, and the fifth piece are arranged in a manner that a right side of the sixth piece and a left side of the eighth piece face each other via an oil groove and that a right side of the eighth piece and a left side of the fifth piece face each other via an oil groove.

5. The wet friction member according to claim 4, wherein all of the segment pieces of the pieces ($G_1$) to ($G_4$) satisfy $0.10 \leq W_2/W_1 \leq 0.80$, when a maximum width of each piece is $W_1$ and a maximum width of each notch part is $W_2$.

6. The wet friction member according to claim 4, wherein all of the segment pieces of the pieces ($G_1$) to ($G_4$) satisfy $0.25 \leq H_2/H_1 \leq 0.75$, when a maximum height of each piece is $H_1$ and a maximum height of each notch part is $H_2$.

7. The wet friction member according to claim 4, wherein all of the segment pieces of the pieces ($G_5$) to ($G_8$) satisfy $0.05 \leq W_2/W_1 \leq 0.40$, when a maximum width of each piece is $W_1$ and a maximum width of one of each notch part is $W_2$.

8. The wet friction member according to claim 4, wherein all of the segment pieces of the pieces ($G_5$) to ($G_8$) satisfy $0.25 \leq H_2/H_1 \leq 0.75$, when a maximum height of each piece is $H_1$ and a maximum height of one of each notch part is $H_2$.

9. A wet friction member comprising a core plate formed in a flat ring shape and a friction part arranged in a ring shape on a main surface of the core plate, wherein the friction part comprises a plurality of segment pieces including the following segment pieces ($G_5$) and ($G_6$):

($G_5$) a fifth piece in which a lower right corner and a lower left corner of an approximately rectangular piece are each notched in an approximately rectangular shape; and ($G_6$) a sixth piece in which an upper right corner and an upper left corner of an approximately rectangular piece are each notched in an approximately rectangular shape; and wherein the fifth piece ($G_5$) and the sixth piece ($G_6$) are arranged adjacent to each other via an oil groove.

10. The wet friction member according to claim 9, wherein all of the segment pieces of the pieces ($G_5$) and ($G_6$) satisfy $0.05 \leq W_2/W_1 \leq 0.40$, when a maximum width of each piece is $W_1$ and a maximum width of one of each notch part is $W_2$.

11. The wet friction member according to claim 9, wherein all of the segment pieces of the pieces ($G_5$) and ($G_6$) satisfy $0.25 \leq H_2/H_1 \leq 0.75$, when a maximum height of each piece is $H_1$ and a maximum height of one of each notch part is $H_2$.

* * * * *